(12) United States Patent
Lu

(10) Patent No.: US 11,947,339 B2
(45) Date of Patent: Apr. 2, 2024

(54) PLANT-WIDE OPTIMIZATION INCLUDING BATCH OPERATIONS

(71) Applicant: Honeywell International Inc., Charlotte, NC (US)

(72) Inventor: Joseph Lu, Glendale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 433 days.

(21) Appl. No.: 17/084,480

(22) Filed: Oct. 29, 2020

(65) Prior Publication Data

US 2021/0132596 A1    May 6, 2021

Related U.S. Application Data

(60) Provisional application No. 62/928,047, filed on Oct. 30, 2019, provisional application No. 62/928,306, filed on Oct. 30, 2019, provisional application No. 62/927,883, filed on Oct. 30, 2019.

(51) Int. Cl.
   *G05B 19/418*  (2006.01)
   *G06N 5/022*   (2023.01)

(52) U.S. Cl.
   CPC ....... *G05B 19/41835* (2013.01); *G06N 5/022* (2013.01); *G05B 2219/42058* (2013.01)

(58) Field of Classification Search
   CPC .... G05B 19/41835; G05B 2219/42058; G05B 13/048; G06N 5/022; Y02P 90/80
   See application file for complete search history.

(56) References Cited

U.S. PATENT DOCUMENTS

| 5,561,599 A | 10/1996 | Lu |
| 6,253,113 B1 | 6/2001 | Lu |
| 6,347,254 B1 | 2/2002 | Lu |

(Continued)

FOREIGN PATENT DOCUMENTS

| EP | 3474092 A2 | 4/2019 |
| EP | 3474092 A3 | 4/2019 |

(Continued)

OTHER PUBLICATIONS

Joseph Lu, "Closing the gap between planning and control: A multiscale MPC cascade approach," IFAC World Congress 2014, Oct. 28, 2014, XP055476858 (60 pgs).

(Continued)

*Primary Examiner* — Eric J Yoon
*Assistant Examiner* — Mohammed Shafayet
(74) *Attorney, Agent, or Firm* — Seager, Tufte & Wickhem, LLP

(57) ABSTRACT

Constraints are received on initial components and intermediate components. Information is received on the products to be produced including a quantity of each of the products to be produced and a specification that specifies how the intermediate components are to be combined to form each of the products. An optimization is performed that includes the continuous conversion of initial components into the intermediate components as well as subsequent production of the products, subject to the constraints on each of the initial components, the constraints on each of the intermediate components, and the quantity of each of the products to be produced.

20 Claims, 29 Drawing Sheets

(56) References Cited

U.S. PATENT DOCUMENTS

| | | |
|---|---|---|
| 7,156,116 B2 | 1/2007 | Lu |
| 7,257,501 B2 | 8/2007 | Zhan et al. |
| 7,274,995 B2 | 9/2007 | Zhan et al. |
| 7,286,945 B2 | 10/2007 | Zhan et al. |
| 7,363,200 B2 | 4/2008 | Lu |
| 7,412,472 B2 | 8/2008 | Lu |
| 7,421,374 B2 | 9/2008 | Zhan et al. |
| 7,469,177 B2 | 12/2008 | Samad et al. |
| 7,574,333 B2 | 8/2009 | Lu |
| 7,743,606 B2 | 6/2010 | Havlena et al. |
| 8,036,758 B2 | 10/2011 | Lu et al. |
| 8,046,089 B2 | 10/2011 | Renfro et al. |
| 8,209,045 B2 | 6/2012 | Morningred et al. |
| 8,992,806 B2 | 3/2015 | Li et al. |
| 9,122,261 B2 | 9/2015 | Lu |
| 9,733,629 B2 | 8/2017 | Lu |
| 10,203,667 B2 | 2/2019 | Escarcega et al. |
| 10,379,503 B2 | 8/2019 | Lu |
| 10,466,684 B2 | 11/2019 | Lu |
| 2002/0107585 A1 | 8/2002 | Lu |
| 2003/0233749 A1* | 12/2003 | Bolotin ............... H05K 13/021 29/711 |
| 2007/0059838 A1* | 3/2007 | Morrison ............. F25J 3/0219 436/55 |
| 2008/0109100 A1* | 5/2008 | Macharia ............ G05B 13/048 700/110 |
| 2011/0040399 A1* | 2/2011 | Lu ....................... G05B 13/024 700/111 |
| 2012/0296690 A1 | 11/2012 | Varvarezos et al. |
| 2016/0018796 A1* | 1/2016 | Lu ....................... G05B 13/048 700/29 |
| 2016/0018797 A1* | 1/2016 | Lu ....................... H04L 41/042 700/3 |
| 2018/0341252 A1 | 11/2018 | Lu |
| 2019/0032945 A1 | 1/2019 | Willmott et al. |

FOREIGN PATENT DOCUMENTS

| | | |
|---|---|---|
| EP | 3312698 B1 | 6/2020 |
| EP | 3805876 A1 | 4/2021 |

OTHER PUBLICATIONS

Extended European Search Report, EP Application No. 20205046.4, dated Mar. 19, 2021 (11 pgs).
Extended European Search Report, EP Application No. 20205051.4, dated Mar. 19, 2021 (9 pgs).
Australian Examination report No. 1 for standard patent application, AU Application No. 2020244508, dated Aug. 12, 2021 (4 pages).

* cited by examiner

| Level | $Fin_{(1..m)}$ | $Fout_{(1..n)}$ | $Fin_{(1..m)} \cdot Prpt\,Y_1$ | $Fin_{(1..m)} \cdot Prpty_r$ |
|---|---|---|---|---|
| Tank-Prpty$_1$ | $\dfrac{P_{1(1..m)}}{V \cdot s + \sum_{i=1}^{m} F_{in_i}}$ | | $\dfrac{Fin_{(1..m)}}{V \cdot s + \sum_{i=1}^{m} F_{in_i}}$ | |
| ... | ... | | | |
| Tank-Prpty$_r$ | $\dfrac{P_{r(1..m)}}{V \cdot s + \sum_{i=1}^{m} F_{in_i}}$ | | | $\dfrac{Fin_{(1..m)}}{V \cdot s + \sum_{i=1}^{m} F_{in_i}}$ |

FIG. 31

PLANT-WIDE OPTIMIZATION INCLUDING BATCH OPERATIONS

This applicant claims the benefit of U.S. Provisional Patent Application Ser. No. 62/927,883, filed Oct. 30, 2019, U.S. Provisional Patent Application Ser. No. 62/928,306 filed Oct. 30, 2019, and U.S. Provisional Patent Application Ser. No. 62/928,047, filed Oct. 30, 2019, all of which are incorporated herein by reference.

TECHNICAL FIELD

This disclosure relates generally to industrial process control and automation systems. More specifically, this disclosure relates to plant-wide optimization of an industrial plant that includes both continuous and batch operations.

BACKGROUND

Processing facilities are often managed using industrial process control and automation systems. While industrial process control and automation systems may be configured to optimize a continuous production processes that produce intermediate components, it would be beneficial to incorporate into the optimization of the continuous production process the subsequent use of the intermediate components to produce final products, particularly when production of the final products represents batch operations or operations that occur under a different time frame than the time frame under which the intermediate components are produced.

SUMMARY

This disclosure provides industrial process control and automation systems and methods that can be optimized for both continuous production of intermediate components and the non-continuous production of final products from those intermediate components. An example method includes optimizing continuous conversion of raw ingredients into intermediate components and non-continuous conversion of the intermediate components into products. In this example, a master model predictive controller (MPC) receives constraints on raw ingredients available for use during a period of time and receives constraints on intermediate components that can be produced during the period of time based at least in part on one or more of the constraints on raw ingredients and inventory storage constraints for the intermediate components and/or products. The master MPC controller also receives information on desired products to be produced from the intermediate components produced, where production of desired products from the intermediate components is governed at least in part by recipes that specify how the intermediate components are combined to form the products. The master MPC controller receives proxy limit values from each of one or more slave MPC controllers, where each of the proxy limit values identifies to what extent one or more process variables controlled by the corresponding slave MPC controller are adjustable without violating any process variable constraints. The master MPC controller performs plant-wide optimization that includes the continuous conversion of raw ingredients into intermediate components as well as the non-continuous production of products, where the proxy limit value allows the master MPC controller to honor the process variable constraints of the one or more slave MPC controllers during the plant-wide optimization. The industrial process is then controlled based at least in part on the plant-wide optimization.

Another example method includes optimizing continuous conversion of initial components into a plurality of intermediate components that are then used as inputs to make a plurality of desired products. Constraints are received on each of one or more of the initial components and on each of the plurality of intermediate components. Information is received on the plurality of desired products to be produced including a quantity of each of the plurality of desired products to be produced and a specification that specifies how the plurality of intermediate components are to be combined to form each of the plurality of desired products. An optimization is performed that includes the continuous conversion of initial components into the plurality of intermediate components as well as subsequent production of the plurality of desired products, subject to the constraints on each of one or more of the initial components, the constraints on each of the plurality of intermediate components, and the quantity of each of the plurality of desired products to be produced. The continuous manufacturing process and the subsequent production of the plurality of desired products is then controlled based at least in part on the optimization.

Another example includes a non-transient computer readable medium with instructions stored hereon. When the instructions are executed by one or more processors, the one or more processors are caused to receive constraints on initial components of a continuous manufacturing process that produces a plurality of intermediate components, and to receive constraints on the plurality of intermediate components produced by the continuous manufacturing process. The one or more processors are caused to receive information on a plurality of desired products to be produced including a quantity of each of the plurality of desired products to be produced and a specification that specifies how the plurality of intermediate components are to be combined to form each of the plurality of desired products. The one or more processors are caused to perform an optimization of the continuous manufacturing process as well as a subsequent production of the plurality of desired products from the plurality of intermediate components, subject to the constraints on initial components of the continuous manufacturing process, the constraints on the plurality of intermediate components, and the quantity of each of the plurality of desired products to be produced. The one or more processors are caused to control the continuous manufacturing process and the subsequent production of the plurality of desired products based at least in part on the optimization.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description of various embodiments of the disclosure in connection with the accompanying drawings, in which:

FIG. 31 is a table that summarizes the modeling of a general pool tank.

Figure 1:
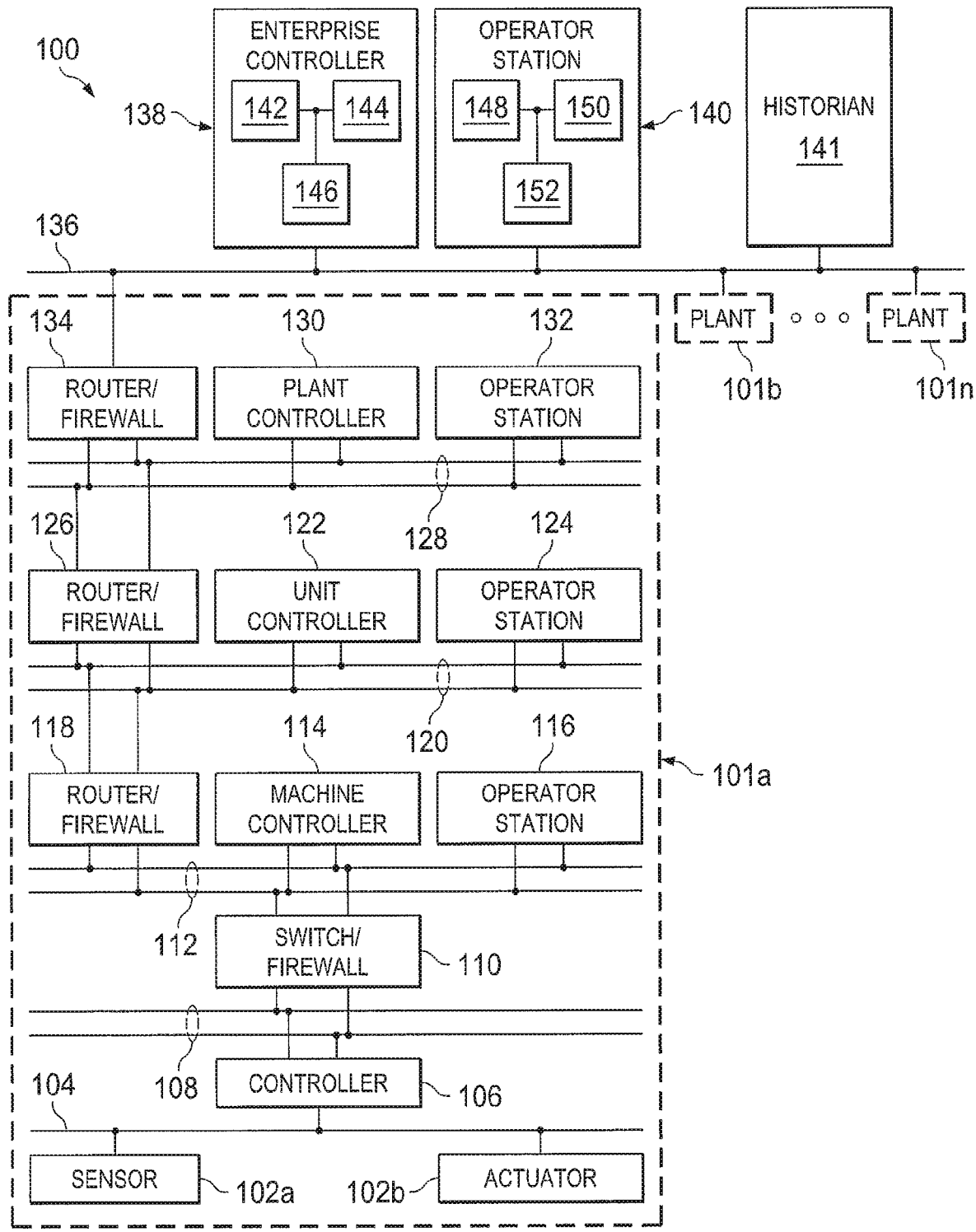
FIG. 1 illustrates an illustrative industrial process control and automation system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant Figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The drawings, which are not necessarily to scale, depict illustrative embodiments and are not intended to limit the scope of the disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller, or other type of controller implementing model predictive control (MPC), dynamic matrix control (DMC), Shell Global Solution's Multivariable Optimization and Control (SMOC), or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals from the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

Over the past several decades, MPC has become the standard multivariable control solution for many industries. The widespread use of MPC has set a solid foundation for a more economically-significant advancement, namely closed-loop plantwide optimization. However, many technical, workflow, and user-experience challenges exist in attempting to provide closed-loop plantwide optimization for most industries. As a result, open-loop plantwide optimization, commonly known as production planning, is still performed. In practice, plantwide planning optimization is rarely if ever implemented as part of a closed-loop control system. In fact, in many industries, planning results are often manually (and hence non-optimally) adjusted through mediating instruments such as daily operator instruction sheets. Because of this, a significant amount of manufacturing profit remains unobtainable.

In some industries, a mediating solution layer, such as an open-loop production scheduler, has been devised to disaggregate a production plan into smaller executable pieces. This scheduler assists the translation of a planning solution into operator actions, but it does not eliminate manual adjustments. In other industries, an open-loop production scheduler has been used in place of production planning, but its output targets are often manually adjusted, as well.

The practice of manually adjusting an open-loop solution often stems from the need to translate or revise high-level production targets in order to (i) satisfy low-level (possibly safety-related) control constraints in process units and (ii) compensate for disturbances to production inventories or product qualities (called "unplanned events" in planning terminology). The technical difficulties involved in manual translation, to a large extent, coincide with the difficulties involved in integrating multi-level solutions that use models at different scales.

This disclosure provides a cascaded MPC solution for plantwide control and optimization, which helps to provide plantwide optimization as part of an automatic control and automation system. As described below, a "master" MPC controller is configured to use a planning model, such as a single-period planning model or other suitable reduced model(s), as a seed model. The master MPC controller performs plantwide economic optimization using its optimizer to control production inventories, manufacturing activities, or product qualities inside a plant. The master MPC controller is cascaded on top of one or more slave MPC controllers. The slave MPC controllers could, for example, represent controllers at the unit level (Level 3) of a system, and each slave MPC controller provides the master MPC controller with its operating states and constraints. Because of this, a plantwide optimization solution from the master MPC controller can honor all unit-level operating constraints from the slave MPC controllers. Jointly, the MPC cascade simultaneously provides both decentralized controls (such as at the unit level) and centralized plantwide optimization (such as at the plant level) in a single consistent control system. The phrases "plantwide optimization" or "plantwide control" refers to optimization or control of multiple units in an industrial facility, regardless of whether those multiple units represent every single unit in the industrial facility.

In this way, this MPC cascade solution enables embedded real-time planning solutions to honor lower-level operating constraints. By cross-leveraging both planning and control models online, the MPC cascade solution makes it possible to run a "reduced-horizon" form of planning optimization within a closed-loop control system in real-time. Among other things, the MPC cascade solution can be used to automatically carry out just-in-time production plans through its slave MPC controllers. The formulation of the reduced-horizon planning optimization in the master MPC controller could be similar or identical to that of a single-period planning optimization as used in offline planning tools but typically with its time-horizon shortened, such as between one and fourteen days.

The remaining description in this patent document is divided as follows. A multiscale model that can be used in industrial process control and automation settings is described, and an MPC cascade solution using the multiscale models is provided. A conduit for merging multiscale models in the form of a proxy limit is described, and a multiscale solution for improving a user's experience is provided. Further, the use of contribution values and contribution costs as a way to cast a central economic objective function to the prices/costs of intermediate streams is disclosed, and model structures that can be used in certain systems using MPC cascade solutions are described. Finally, a model validation technique is provided, techniques for handling master-slave variables in MPC cascade solutions are disclosed, and techniques for estimating the feasible region in which an industrial process can be adjusted are provided.

Although FIG. 1 illustrates one example of an industrial process control and automation system 100, various changes may be made to FIG. 1. For example, a control and automation system could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which an MPC cascade solution can be used. This functionality can be used in any other suitable device or system.

Multiscale Model

Consider an industrial plant having multiple units. At a high level, the overall material, component, and energy balances among all process units should be established. At a low level, each unit should be properly controlled to ensure safety in the plant and smooth efficient operation of the unit.

Figure 2A:
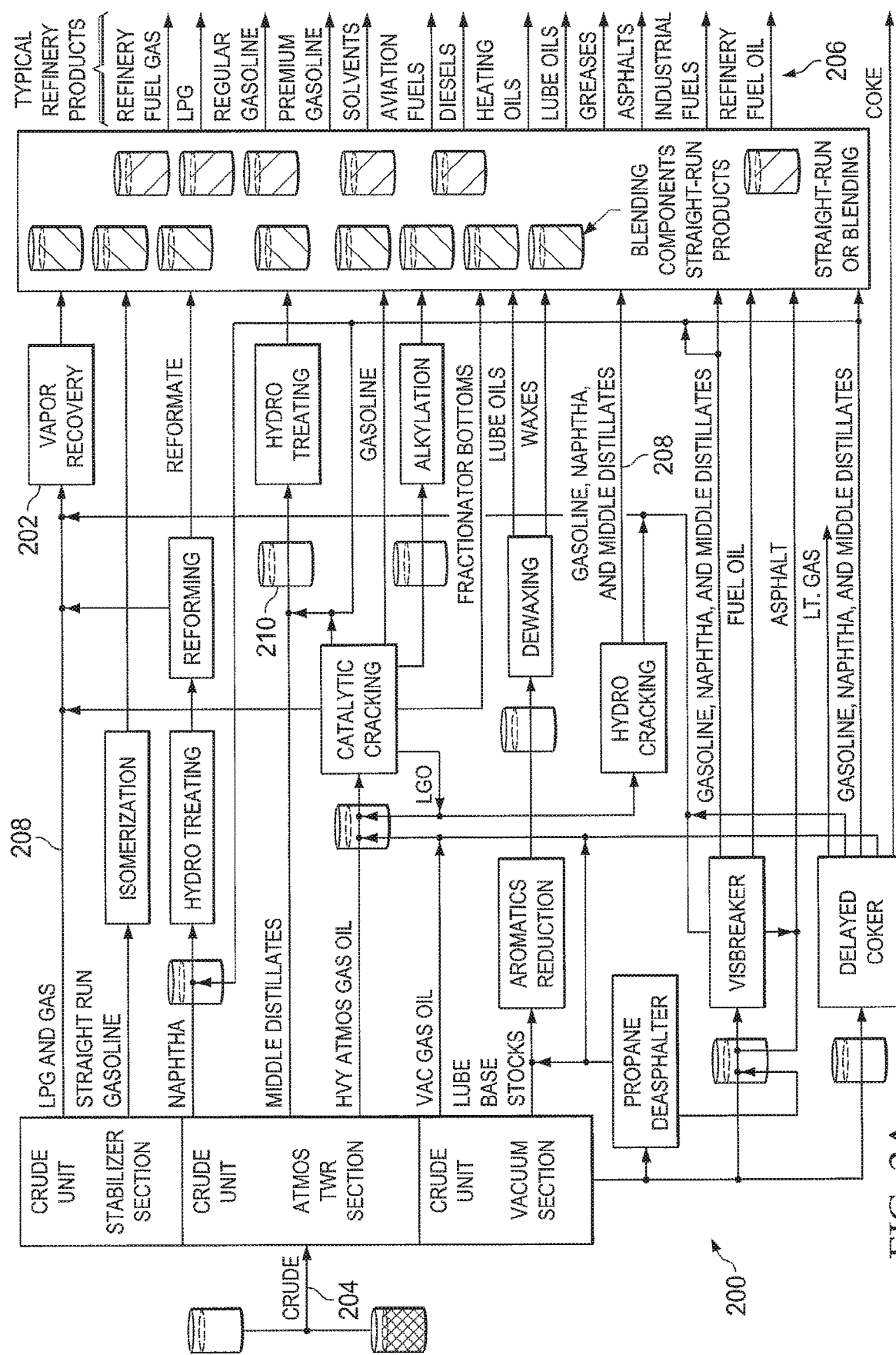
FIGS. 2A and 2B illustrate illustrative planning and model predictive control (MPC) models used to support a cascaded MPC approach in an industrial process control and automation system.
Figure 2B:
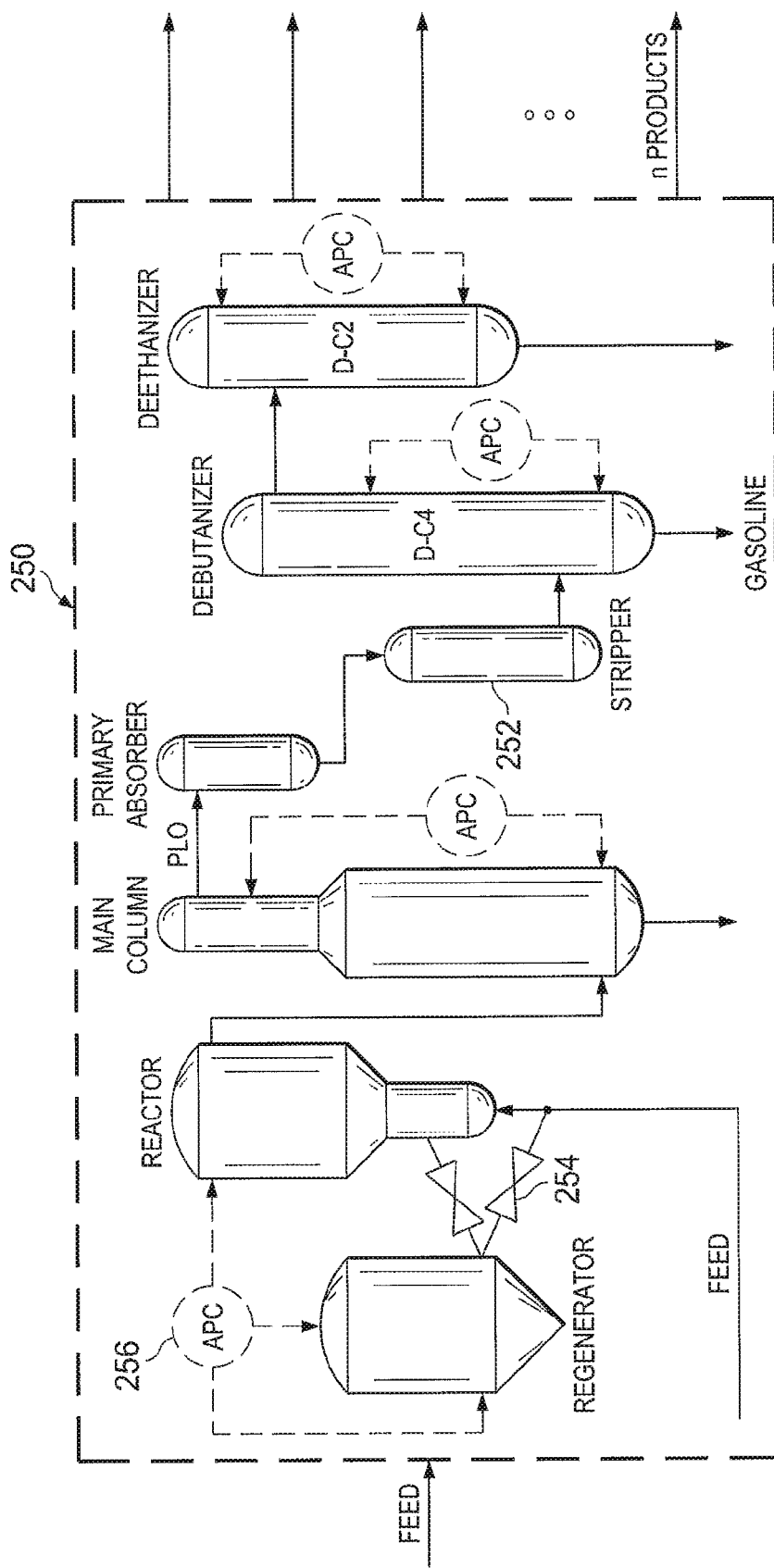

Planning and MPC models are an example of a multiscale model pair that could be used to solve multi-level problems in a cascaded MPC architecture. FIGS. 2A and 2B illustrate example planning and MPC models used to support a cascaded MPC approach in an industrial process control and automation system according to this disclosure. In particular, FIG. 2A represents a yield-based planning model 200, and FIG. 2B represents an MPC model 250.

As shown in FIG. 2A, the planning model 200 identifies multiple units 202, which generally operate to convert one or more input streams 204 of feed materials into one or more output streams 206 of processed materials. In this example, the units 202 denote components in an oil and gas refinery that convert a single input stream 204 (crude oil) into multiple output streams 206 (different refined oil/gas products). Various intermediate components 208 are created by the units 202, and one or more storage tanks 210 could be used to store one or more of the intermediate components 208. As shown in FIG. 2B, the MPC model 250 identifies multiple components 252 of a single unit. Various valves and other actuators 254 can be used to adjust operations within the unit, and various APCs and other controllers 256 can be used to control the actuators within the unit.

In general, a planning model 200 looks at an entire plant (or portion thereof) with a "bird's eye" view and thus represents individual units on a coarse scale. A planning model 200 focuses on the inter-unit steady-state relationships pertaining to unit productions, product qualities, material and energy balances, and manufacturing activities inside the plant. A planning model 200 is typically (but not always) composed of process yield models and product quality properties. A planning model 200 can be constructed from a combination of various sources, such as planning tools, scheduling tools, yield validation tools and/or historical operating data. An MPC model 250, however, represents at least one unit on a finer scale. An MPC model 250 focuses on the intra-unit dynamic relationships between controlled variables (CVs), manipulated variables (MVs), and disturbance variables (DVs) pertaining to the safe, smooth, and efficient operation of a unit. The time scales of the two models 200, 250 are also different. An MPC model's time horizon typically ranges from minutes to hours, while a planning model's time horizon typically ranges from days to months. Note that a "controlled variable" generally denotes a variable whose value is controlled to be at or near a setpoint or within a desired range, while a "manipulated variable" generally denotes a variable that is adjusted in order to alter the value of at least one controlled variable. A "disturbance variable" generally denotes a variable whose value can be considered but not controlled or adjusted.

A planning model 200 often can and should exclude non-production-related or non-economically-related variables, such as pressures, temperatures, tank levels, and valve openings within each unit. Instead, a planning model 200 can reduce a process unit to one or several material or energy yield vectors. The MPC model 250, on the other hand, typically includes all of the operating variables for control purposes in order to help ensure the safe and effective operation of a unit. As a result, the MPC model 250 includes many more variables for a unit compared to the planning model 200. As a specific example, an MPC model 250 for an oil refinery's Fluidized Catalytic Cracking Unit (FCCU) could contain about 100 CVs (outputs) and 40 MVs (inputs). The planning model 200 of the same unit could focus only on key causal relationships between the feed quality and operating modes (as inputs) and the FCCU product yield and quality (as outputs), so the planning model 200 could have as few as three or four inputs and ten outputs. This variable difference has conventionally been a barrier to effectively integrating multi-level solutions. Additional differences are summarized in Table 1 below, which compares the typical focuses of the two models 200, 250.

TABLE 1

| Model Type | Users | Purpose & Advantages | Typical Tasks | Typical Decision Variables | Time Scale |
|---|---|---|---|---|---|
| Yield model | Planning personnel and others | Plantwide or multi-site<br>Sharp focus on key economic factors and inter-unit material and energy balances<br>Bird's eye (compact) view of plantwide operations<br>Free of unnecessary or obscuring details | Produce the right amounts and at the right specs<br>Coordinate the productions among different units<br>Satisfy inventory (and possibly other logistic) inter-unit constraints | Plant/unit material flow configurations<br>Unit feed rates, operating modes and/or severities<br>Feed choices<br>Product mix<br>Buy vs. sell decisions | Longer time horizon<br>Less frequently executed<br>Open-loop MPC |
| MPC model | APC and process engineers | Intra-unit or multi-unit<br>Sharp focus on safety, operability and product quality of a process unit<br>Unit-level efficiency is a secondary goal | Control all safety and operability related CVs<br>Control product quality within specs<br>Operate the unit at a desirable operating point | Flows, including unit feed rates<br>Temperatures<br>Pressures<br>Levels<br>Pump arounds | Shorter time horizon<br>More frequently executed<br>Closed-loop |

There are several advantages of using a coarse-scale planning model 200. For example, plantwide economic optimization can be compactly and clearly formulated using a planning model 200 without getting entangled with possibly-obscuring details inside any single process unit. Also, a divide-and-conquer approach can be employed to solve a high-level optimization problem first and then find a way to pass the solution down to each unit.

While a compact well-built planning model 200 makes a planning problem easy to set up, clear to view, and quick to solve, it comes with a drawback—it has no visibility of the detailed variables inside any unit. Although many of these detailed variables may have little to do with high-level production planning, a small subset usually does. When a planning model 200 has no visibility inside any lower-level unit, it cannot guarantee that its solution, optimal or not, will honor lower-level constraints of all units. This is one reason why a conventional planning solution often needs to be manually translated or revised to accommodate operating constraints inside the units, and a significant profit margin can be lost in the translation. The same can be said for a scheduling solution if it uses a yield-based planning model 200 that is at a coarse scale.

From a holistic perspective, an optimization or control problem formulated with a high-level yield-based planning model 200 could benefit from low-level MPC models 250. The rationale is that the details used for guaranteeing constraint satisfaction in a unit are typically already in the unit's MPC model 250, although these details are not necessarily organized in the right model format. Ideally, an MPC model 250 can be used to supplement the details of a unit's constraints for planning on an as-needed basis. The cascaded MPC approach described below provides a structural framework in which MPC models can be effectively used to supply low-level fine-scale model information to high-level coarse-scale plantwide optimization formulation or control formulation. The cascaded MPC approach described below can make use of planning models 200 and MPC models 250 to provide this functionality.

Cascaded MPC Solution Using Multiscale Models

From a plantwide perspective, control and planning are often coupled. Planning typically relies on control to establish a feasible region for optimization, while control typically relies on planning to coordinate units and run an entire plant at its highest possible profitable operating point Planning therefore often depends on MPC controllers to push constraints inside each unit to create a bigger feasible region for plantwide optimization. Meanwhile, MPC controllers often depend on guidance from planning before the MPC controllers know which constraints are truly plantwide bottlenecks and should thus be pushed and which constraints are not and could remain inactive. These two solution layers therefore co-depend on each other and should be treated simultaneously.

One way to solve this coupled problem is to design the control and plantwide optimization jointly. Since each MPC controller has an embedded economic optimizer, a single large plantwide MPC controller that performs both plantwide optimization and unit-level MPC control could be devised. However, such a monolithic all-or-nothing MPC solution has various drawbacks. One challenge of any joint design approach has been simultaneously providing decentralized controls at lower levels and centralized optimization at higher levels.

Figure 3A:
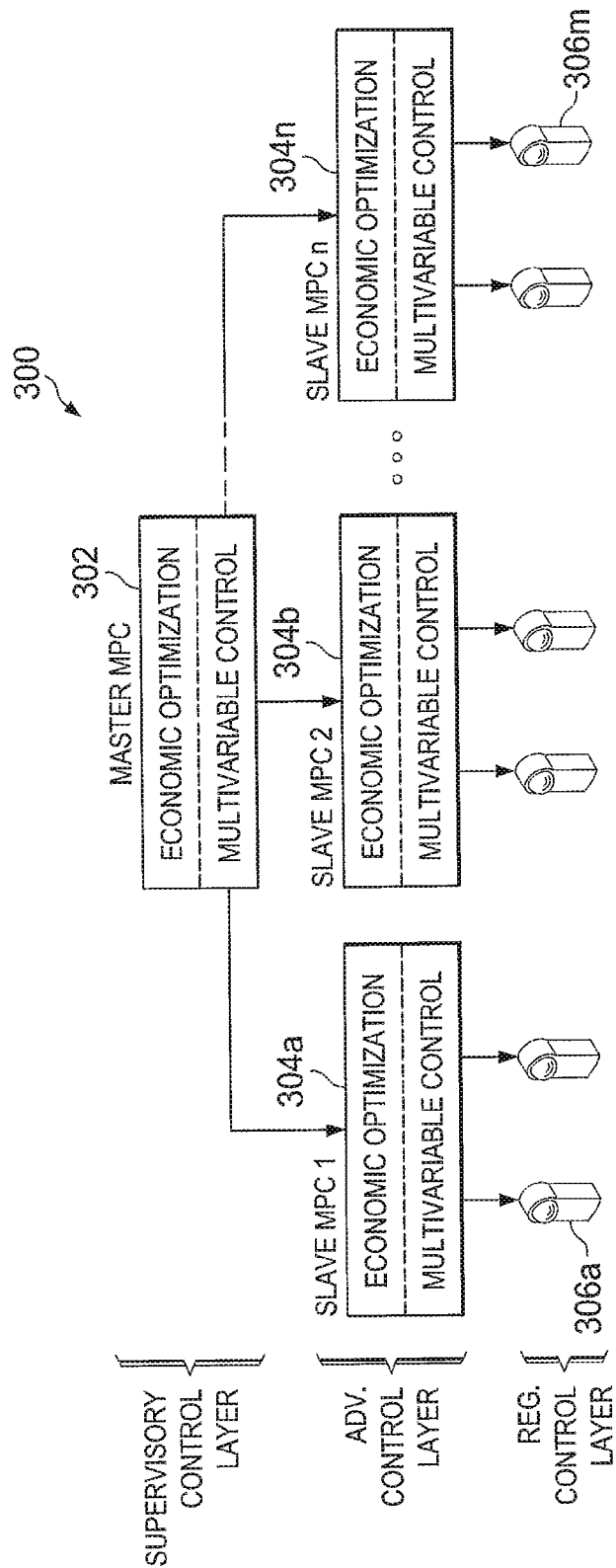
FIGS. 3A through 3C illustrate an illustrative cascaded MPC architecture for an industrial process control and automation system.
Figure 3B:
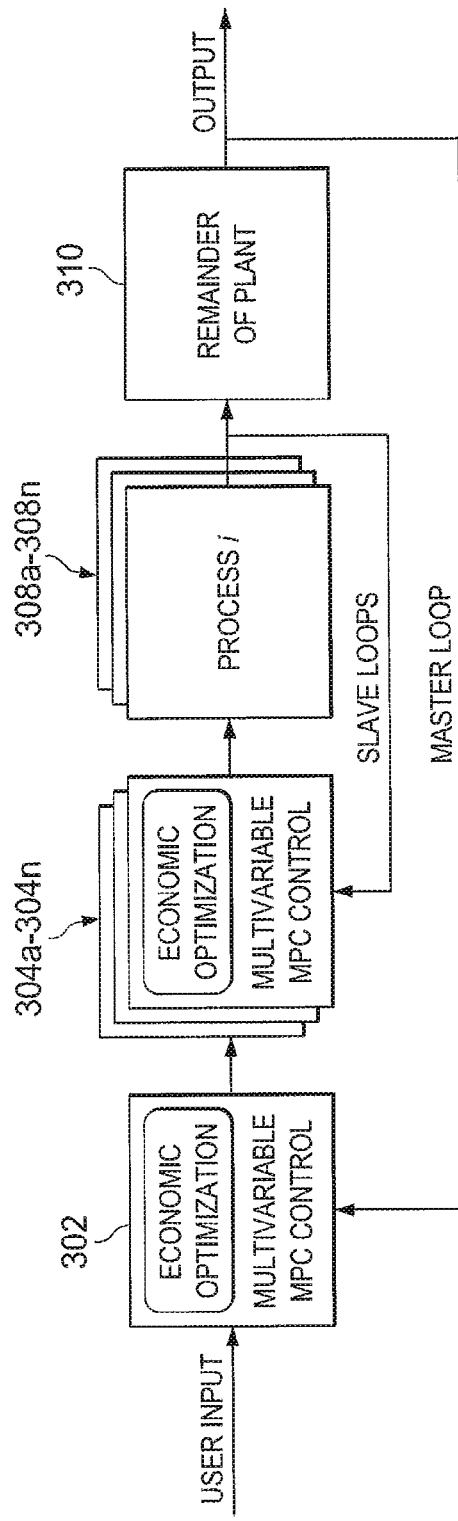
Figure 3C:
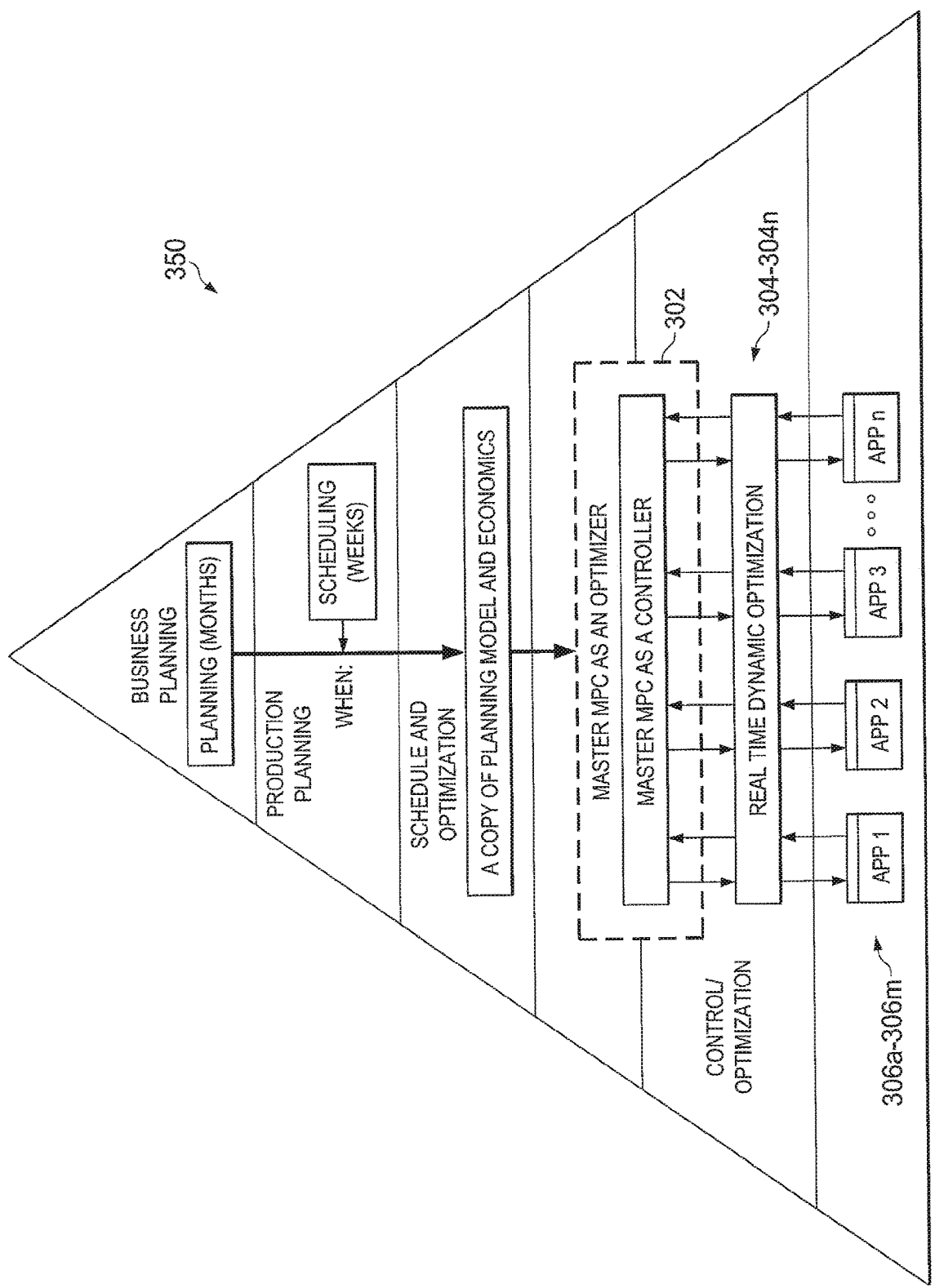

FIGS. 3A through 3C illustrate an example cascaded MPC architecture 300 for an industrial process control and automation system according to this disclosure. As shown in FIGS. 3A and 3B, the cascaded architecture 300 includes a master MPC controller 302 and one or more slave MPC controllers 304a-304n. The slave MPC controllers 304a-304n interact with one or more regular process controllers 306a-306m, which are associated with one or more processes 308a-308n within a plant. The slave MPC controllers 304a-304n could denote Level 3 controllers, while the process controllers 306a-306m could denote Level 2 controllers. A remainder 310 of the plant could include Level 1 controllers, sensors, actuators, and other lower-level components. The master MPC controller 302 generally operates within a master control loop, while each slave MPC controller 304a-304n generally operates within a slave control loop. There could be one or multiple slave control loops within a single master control loop.

Each MPC controller 302, 304a-304n supports economic optimization and multivariable control functions. The master MPC controller 302 uses a planning model 200 (such as a yield-based single-period planning model) to provide an initial steady-state gain matrix, and relevant model dynamics can be determined using operating data of the plant (such as historical data). The master MPC controller 302 operates to control product inventories, manufacturing activities, or product qualities within the plant. The embedded economic optimizer of the master MPC controller 302, which is furnished with the same planning model structure and economics, could therefore reproduce the single-period offline planning optimization but in an online and real-time manner.

The master MPC controller 302 cascades on top of n slave MPC controllers 304a-304n (n is an integer value greater than or equal to one). The slave MPC controllers 304a-304n provide the master MPC controller 302 with future predictions and operating constraints for each unit of a plant. With this information, a real-time planning solution from the cascaded architecture 300 reduces or eliminates the drawbacks discussed above. Jointly, the MPC controllers 302, 304a-304n provide simultaneously decentralized controls at lower levels with fine-scale MPC models 250 and centralized plantwide optimization at higher levels with a coarse-scale planning model 200, all in one consistent cascaded control system.

Another reason a production plan often needs to be manually converted into a set of operating instructions is that an open-loop planning solution has a time horizon that typically ranges from several days to a month (for a single period), and it is commonly executed only once a day or once every several days. Thus, it lacks an effective feedback mechanism to deal with uncertainties, such as changes in feed quality or in ambient conditions, process unit upsets, heating or cooling capacity limitations, and maintenances. In order to help deal with these situations, an optimizer is embedded in the master MPC controller 302, and the optimizer can execute at a user-defined frequency, such as one ranging from once every several minutes to once an hour. Both production quantities and qualities of each unit can be measured or estimated at that frequency, and prediction errors can be bias-corrected in the master MPC controller 302 as in any standard MPC. If any deviations from the original optimal plan are detected, a plantwide re-optimization can take place immediately. The new optimal production targets can then be sent to and get carried out by the slave MPC controllers 304a-304n, reducing or eliminating the need for manual translation or adjustment.

Certain optimization settings can also be modified from conventional MPC optimization settings in order to capture additional benefits in real-time. Some similarities and differences between the traditional MPC approach and the cascaded MPC solution could include the following:

The objective function can remain the same as in the offline planning counterpart.

The time horizon in the master MPC controller 302 can be an online tuning parameter, such as one ranging from several hours to several days or weeks, and it can be shorter than the time horizon used in offline (particularly multi-period) planning The tuning can be set to capture more benefits in the form of just-in-time manufacturing. Considerations for tuning may include (as examples) how far in advance product orders are placed, the variance of product orders (both in quantities and grades), what additional buy/sell opportunities can be pursued, and what semi-finished components can be exchanged with partners or bought/sold on the spot market.

Production inventories and product properties can be controlled dynamically with real-time measurement feedback.

Product orders within the time horizon are known, as opposed to being estimated in the offline counterpart. The master MPC controller 302 can produce a just-in-time production plan as opposed to a plan based on assumed orders.

The planning model 200 used in the master MPC controller 302 can be updated in real-time with a yield validation mechanism associated with the slave MPC controllers 304a-304n. After cross-validation (such as for metering errors), measured yields can be used to update the planning model 200, and the master MPC controller 302 can generate a more accurate profitable production plan.

The cascaded architecture 300 provides a control hierarchical view 350 as shown in FIG. 3C. The cascaded architecture 300 breaks down partitioning lines in a conventional control and automation system by obtaining a copy of the planning model 200 and grafting it onto an MPC controller by adding delays and ramps. Unit feed rates can be used as MVs, and production inventories can be used as CVs at the master MPC controller 302. The master MPC controller 302 is a real-time plan executor that understands the big picture from the planning model 200 and uses each unit's MPC models 250 for advanced process control. The master MPC controller 302 can therefore optimize the plant in concert with the slave MPC controllers 304a-304n, generating the best-achievable plan while honoring all units' constraints.

The planning model 200 used by the master MPC controller 302 can be thought of as containing two parts, namely (i) a dynamic model for MPC control and (ii) a steady-state model for economic optimization (which is the steady-state part of the dynamic model). The master MPC controller 302 reproduces the offline planning optimization as closely to the original plan as makes sense in real-time by leveraging MPC feedback to improve the accuracy of the offline planning optimization, thereby incorporating real-time information that was not available before. The dynamics of the master MPC controller's model 200 can be identified from the plant's operating data, and the master MPC controller 302 can provide the desired inventory/property controls in closed-loop. Because the control and optimization solutions from the master MPC controller 302 honor the operating constraints from the slave MPC controllers 304a-304n, this enables the master MPC controller 302 to run in the closed-loop and makes the MPC cascade possible. This is done while providing both centralized compact plant-level optimization and unit-level decentralized MPC controls.

The multivariable control functionality of the master MPC controller 302 can represent a type of production controller or inventory controller that uses inventory levels as its main CVs ("inventory" here refers to an accumulative amount of material/energy/etc. at a current state, at a predicted future state, or both). Each unit change rate (or MV) can be configured directly through the master MPC controller 302, indirectly via a slave MPC controller 304a-304n, or indirectly via a process controller 306a-306m (such as an RMPCT controller). Each slave MPC controller 304a-304n can predict the "room left" in each unit's change rate (via proxy limits described below), and the master MPC controller 302 can refrain from requesting a change rate that the unit cannot accept. The master MPC controller 302 can further include CVs for material/energy balance (models/constraints).

The master MPC controller 302 includes any suitable structure for performing economic optimization operations using a planning model. The master MPC controller 302 could, for example, represent a single input single output (SISO) controller, a multiple input multiple output (MIMO) controller, or a controller with other numbers of inputs and outputs. Each slave MPC controller 304a-304n includes any suitable structure for interacting with a master MPC controller. Each slave MPC controller 304a-304n could, for instance, represent a SISO controller, a MIMO controller, or a controller with other numbers of inputs and outputs.

Proxy Limits

The master MPC controller 302 is an independent MPC controller using a reduced model. In order for the master MPC controller 302 to cascade over the slave MPC controllers 304a-304n, the master MPC controller 302 honors the constraints of the slave controllers 304a-304n, or the overall combined solution may not be optimal or even feasible to implement. To help avoid this situation, a proxy limit is used to merge multiscale models. A proxy limit is an alternative representation of a slave MPC controller's constraint(s) in the master MPC controller's space. Proxy limits can be viewed as conduits between individual slave MPC controllers and the master MPC controller to "transport" the slave MPC controllers' constraints to the master MPC controller. Proxy limits from multiple slave MPC controllers 304a-304n can be combined and included in the master MPC controller's control and economic optimization formulations.

Proxy limits can be expressed in the MV space of the master MPC controller 302, but their boundary values can be computed in the MV space of the slave MPC controllers 304a-304n. For each MV of the master MPC controller 302, each of its downstream slave MPC controllers can predict the amount of distance it could move before one or more slave CVs or MVs would reach their operating limits. When two or more MVs from the master MPC controller 302 are associated with a slave MPC controller 304a-304n, the proxy limits can be multivariate in nature.

Figure 4:
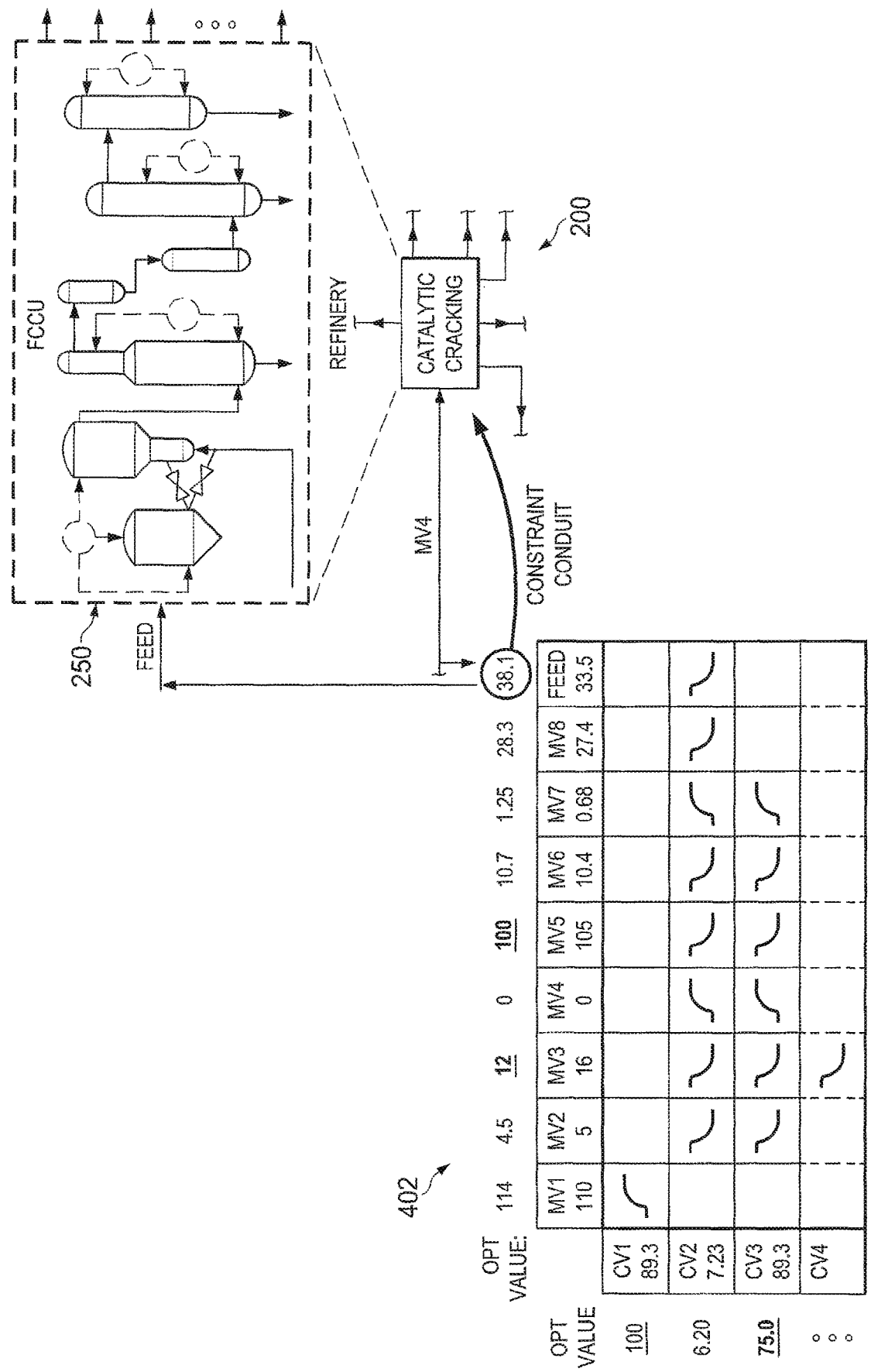
FIG. 4 illustrates an illustrative use of a proxy limit in a cascaded MPC architecture.

FIG. 4 illustrates an example use of a proxy limit in a cascaded MPC architecture according to this disclosure. In particular, FIG. 4 illustrates an example use of a proxy limit in the cascaded architecture for an FCCU, where one proxy limit can sufficiently represent the entire unit. Suppose that the FCCU's feed is configured as MV4 in the planning model 200 for the master MPC controller 302 and as MV9 in the MPC model 250 for the slave MPC controller 304a. Also, assume that the current feed rate to the unit has a value of 33.5. Further assume that the slave MPC controller 304a predicts that the feed rate could be increased up to a maximum value of 38.1 before one or more slave CVs and/or MVs would hit one or more limits as shown in table 402. The table 402 here shows different CVs controlled by the slave MPC controller 304a and different MVs used by the slave MPC controller 304a to control those CVs. The maximum boundary value of 38.1 is passed to the master MPC controller 302 and used as a high proxy limit for the master MPC controller's MV4.

In each unit, regardless of how many slave constraints can limit a master MPC controller's MV (such as the unit feed rate), the master MPC controller 302 only needs to know the point where it should stop pushing its MV (otherwise some lower-level constraint violation can result). This stopping point coincides with the proxy limit, which represents the entire set of active slave constraints in the corresponding low-level unit that can limit the master MPC controller's MV. In the specific example above, only one proxy limit is needed for all slave constraints in the low-level FCCU unit, although multiple proxy limits could also be used.

One feature of proxy limits is that all slave MPC constraints in a unit can be distilled into one or several proxy limits. The proxy limits therefore function as a bonding mechanism for keeping the coarse-scale model 200 intact in the master MPC controller 302 while merging it effectively with the fine-scale slave MPC models 250. In other words, this makes it possible to keep the plantwide optimization problem inside the master MPC controller 302 in its original compact planning format without forcing the coarse-scale model 200 to be expanded into a compatible fine-scale model.

With the help of proxy limits, the joint optimization solution using the cascaded MPC approach provides various benefits. For example, the embedded real-time planning solution honors unit-level operating constraints in the slave MPC controllers 304a-304n, and the master MPC controller 302 dynamically controls the same set of variables (such as inventories or qualities) that an offline planning tool would manage in open loop. Effectively, all relevant MPC constraints in a unit are distilled into one or more proxy limits, which in turn are included in the master MPC controller's optimization. Moreover, proxy limits make the layered-optimization more attractive than a single layer. In addition, the practice of manual adjustment or translation of an open-loop optimization solution can be reduced or eliminated. By cross-leveraging both planning and control models online, the cascaded MPC approach makes it possible to run plantwide optimization within a closed-loop control system in real-time. It thus provides simultaneously a centralized optimization with a coarse-scale planning model 200 at the plant level and decentralized controls with fine-scale MPC models 250 at the unit level.

Note that the concept of MPC cascading with proxy limits has been described as being performed with Level 3 MPC controllers as the slave controllers. However, this concept can be used with or extended to different levels of a control and automation system. For example, master MPC controllers in multiple cascaded architectures 300 within a plant could form slave MPC controllers for a plant-level master MPC controller. As a particular example, the plant-level master MPC controller for an oil/gas refinery could use a simple yield vector (crude oil as one input feed and refined products as multiple output feeds). Similarly, multiple plant-level master MPC controllers could function as slave MPC controllers to an enterprise-level master MPC controller. As a particular example, if different refineries are associated with different markets, an enterprise-level master MPC controller over multiple refineries could compute global optimum values based on regional product demands/supply and each refinery's production capacity in real-time.

Multiscale Solution for Improving User Experience

Figure 5:
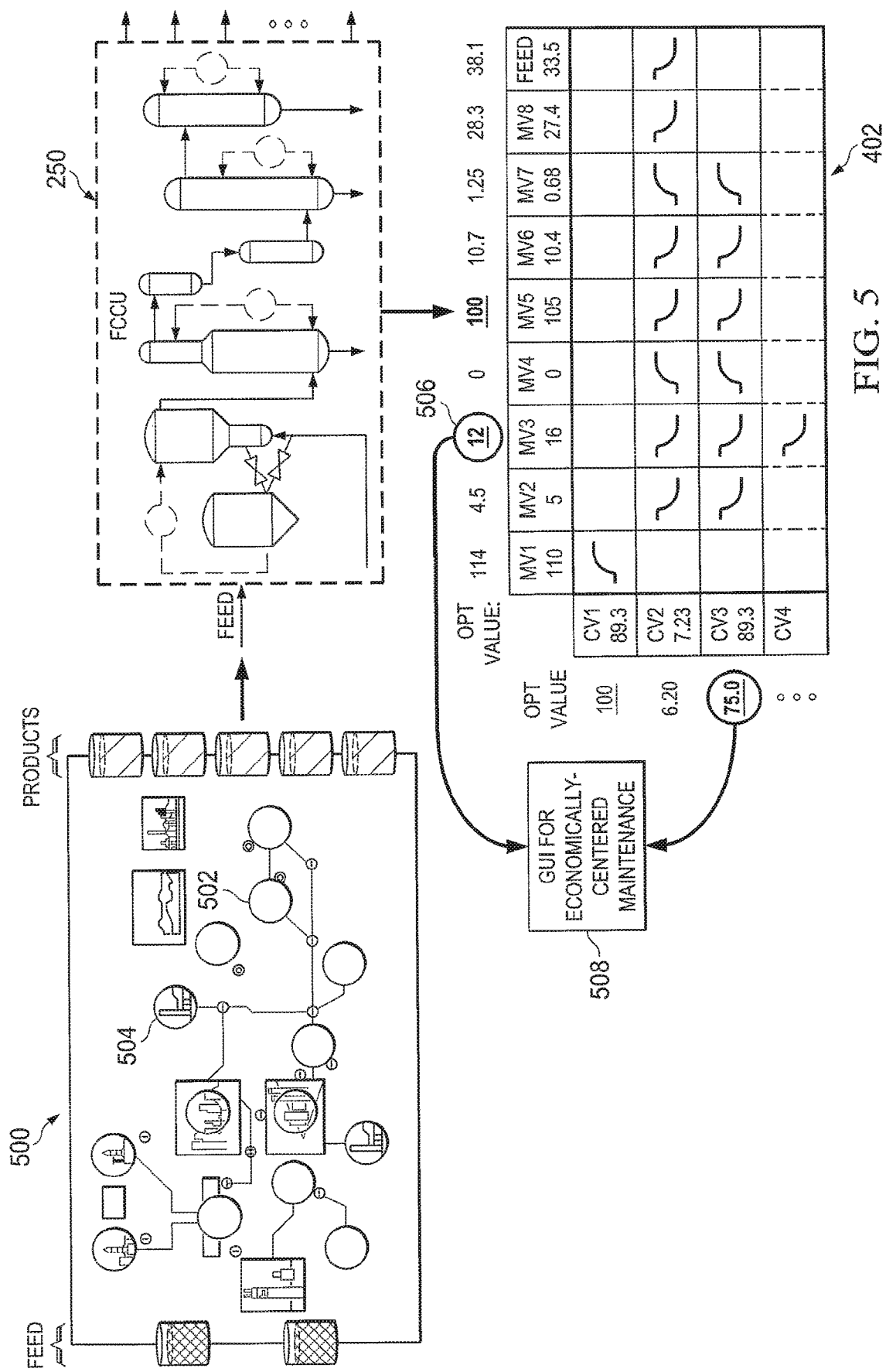
FIG. 5 illustrates an illustrative graphical user interface (GUI) for use with a cascaded MPC architecture.

Since the cascaded MPC architecture 300 uses a pair of models, the planning model 200 can naturally be used to provide a graphical user interface (GUI) with a clear bird's eye view of a plant. FIG. 5 illustrates an example GUI 500 for use with a cascaded MPC architecture according to this disclosure. The GUI 500 includes various icons 502 identifying different units 202 within the planning model 200. The master MPC controller 302 can provide various information within the GUI 500. For example, the master MPC controller 302 could provide unit production rates, available inventories, scheduled product deliveries, cost structures, total profit margins, each unit's contribution to the profit margin, and other relevant information pertaining to the real-time execution of a production plan.

The master MPC controller 302 also allows an operator to easily identify within the GUI 500 which units are plantwide bottlenecks by looking at their proxy limits. Any unit 202 with at least one active proxy limit is a global bottleneck, such as when the unit's throughput is actually constrained by low-level constraints inside its slave MPC controllers. These units can be graphically identified using indicators 504, such as colored circles, in the GUI 500 to provide a clear "at a glance" view. A marginal profit value could optionally be displayed next to each bottleneck unit to indicate the incremental amount of profit that the plant could achieve if the unit's throughput is increased.

The operator (such as a production manager or planner) can use the GUI 500 to drill down into a bottleneck unit. For example, if a particular icon 502 in the GUI 500 is selected, the MPC model 250 for the selected unit 202 could be displayed to the operator. The displayed MPC model 250 represents a slave MPC controller's GUI, which shows active constraints that are currently limiting the unit's production throughput. If a particular controller in the MPC model 250 is selected, the table 402 could be displayed to the operator.

Variables in the table 402 that are currently acting as constraints (such as due to equipment or maintenance issues) could be identified using indicators 506 (such as colored circles). If a particular variable in the table 402 is selected by the operator, a maintenance GUI 508 or other interface could be presented to the operator. For instance, the operator could select a valve constraint and view a maintenance GUI 508 for that valve. The maintenance GUI 508 could indicate that the valve is scheduled for maintenance in two weeks. As with the master MPC controller 302, a slave MPC controller 304a-304n could display a marginal profit value next to each active constraint in the table 402 to indicate the incremental amount of profit that the plant could achieve if the constraint was relieved (which in turn would help increase the throughput).

In a complex facility, there is typically a long list of actuators and other equipment that need to be serviced at any given time. Maintenance personnel often do not have adequate guidance to prioritize their maintenance tasks. The same can be said about APC maintenance tasks and other maintenance tasks. In the manner shown in FIG. 5, each maintenance task can be tagged with an incremental profit amount, and the task list can be easily sorted by profit impact rather than by service request time. Often, bottlenecks can be caused by simple maintenance issues in a unit. Some profit-impacting items could stay unrepaired for a long time because no one knows the cost of not fixing those items. With multi-tier control system GUIs, maintenance tasks can be easily sorted by their economic impacts, and a new economic-centered automation maintenance framework can be established.

Contribution Values and Costs

Returning to FIG. 2A, as noted above, the process units 202 shown in the planning model 200 generally operate to convert one or more input streams 204 into one or more output streams 206 while creating various intermediate components 208. A master MPC controller 302 or slave MPC controllers 304a-304n could use contribution values and/or contribution costs when performing their control or optimization operations.

Each contribution value may be associated with an intermediate product that is used to produce one or more final products (a final product represents a product output by the process system). A contribution value may be computed using that intermediate product's contribution to each final product and each final product's price. In some embodiments, an intermediate product's contribution value is calculated as:

$$\Sigma_{i=1}^{n} \text{Contribution}_i(\%) \times \text{ProductPrice}_i - \text{FurtherProcessingCost}_i \quad (1).$$

Here, n represents the number of final products that can be produced using an intermediate product. Also, Contribution$_i$ represents the percentage of the intermediate product that is dedicated to producing the $i^{th}$ final product, and ProductPrice$_i$ represents the expected or current market price for the $i^{th}$ final product. In addition, FurtherProcessingCost$_i$ represents the additional processing cost needed to produce the $i^{th}$ final product (which may optionally be omitted or set to zero).

In other embodiments, an intermediate product's contribution value is calculated as:

$$\Sigma_{i=1}^{n} \text{Contribution}_i(\%) \times \text{AdjustedProductPrice}_i - \text{FurtherProcessingCost}_i \quad (2).$$

Here, the product price for the final product can be adjusted to correct for various over-production and under-production scenarios or other situations. For instance, when the projected production of the $i^{th}$ final product exceeds its plan, the final product's price can be decreased to account for storage costs and future order risks. When the projected production of the $i^{th}$ final product is below its plan, the final product's price can be increased if there is a penalty for missing an order deadline.

Note that various adjustments can also be made to the contribution values. For example, when storage is available, a commonly-valuable intermediate product could be stored and saved for the next planning period (rather than reducing its contribution value in the current period). As another example, if an excess intermediate product can be sold on a spot market, a higher contribution value could be assigned to the intermediate product. Further, note that contribution values can be tied together for a current planning period and for the next planning period, which can help to reduce undesirable diminishing horizon effects at the current period's end.

Each contribution cost may be associated with an intermediate product that is produced using one or more feed products (a feed product represents a material input into a process system). A contribution cost may be computed using that intermediate product's use of each feed product and each feed product's price. In some embodiments, an intermediate product's contribution cost is calculated as:

$$\Sigma_{i=1}^{m} \text{Contribution}_i(\%) \times \text{FeedCost}_i + \text{UpstreamProcessingCost}_i \quad (3).$$

Here, m represents the number of feed products used to produce an intermediate product. Also, Contribution$_i$ represents the percentage of the $i^{th}$ feed product that is dedicated to producing the intermediate product, and FeedCost$_i$ represents the expected or current market price for the $i^{th}$ feed product. In addition, UpstreamProcessingCost$_i$ represents the processing costs needed to process the $i^{th}$ feed product and produce the intermediate product (which may optionally be omitted or set to zero).

In other embodiments, an intermediate product's contribution cost is calculated as:

$$\Sigma_{i=1}^{m} \text{Contribution}_i(\%) \times \text{AdjustedFeedCost}_i + \text{UpstreamProcessingCost}_i \quad (4).$$

Here, the cost for the $i^{th}$ feed product can be adjusted to correct for various over-production and under-production scenarios or other situations. For instance, when the projected inventory of the $i^{th}$ feed product exceeds its plan or storage capacity, its adjusted cost can be decreased to promote consumption. When the projected inventory of the $i^{th}$ feed product falls below its plan or storage capacity, its adjusted cost can be increased to reduce consumption. Note that various adjustments can also be made to the contribution costs. For example, when the adjusted cost of a feed product is greater than its spot market price, a "make versus buy" analysis could be used to determine whether it would be more economical to purchase an intermediate product instead of producing it.

Figure 6:
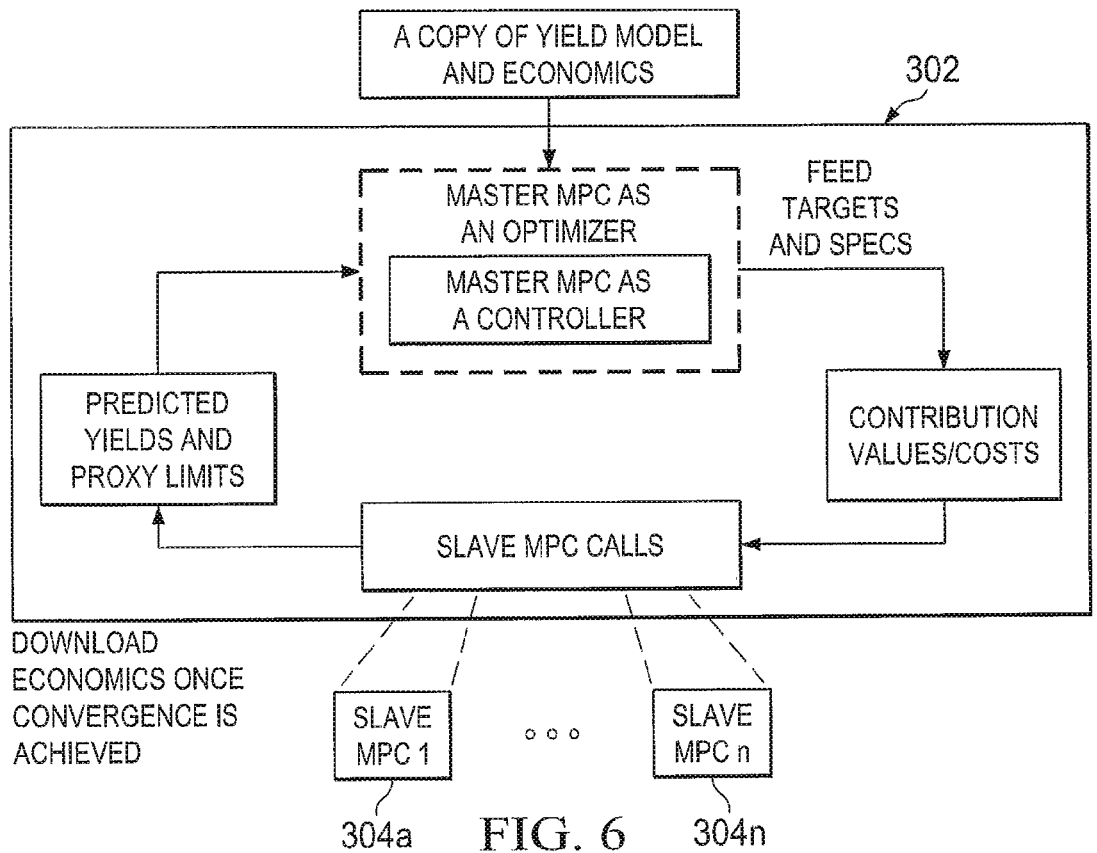
FIG. 6 illustrates an illustrative technique for using contribution values and contribution costs with a cascaded MPC architecture.

FIG. 6 illustrates an example technique for using contribution values and contribution costs with a cascaded MPC architecture according to this disclosure. In this example, the master MPC controller 302 operates to iteratively identify (i) contribution values and contribution costs based on its planning model, its economics, and data from prior iterations and (ii) predicted yields based on the contribution values and costs and proxy values. The contribution values and contribution costs can be provided to the slave MPC controllers for their local optimization needs. Once an optimal solution (such as an optimized plan) is found, the master MPC controller 302 provides optimized economics to the slave MPC controllers 304a-304n. Additional details regarding the operations of the master MPC controller 302 with respect to using contribution values can be found in U.S. Patent Application Publication No. 2011/0040399 (which is hereby incorporated by reference in its entirety).

Example Planning Model Structures

In some embodiments, a planning model 200 for a master MPC controller 302 can be formed using one or more base models. For example, two base models (a processing unit model and a pool tank model) could be provided for forming planning models. A processing unit can be modeled as one or more input feeds and one or more output feeds. A pool tank can be modeled as a mixing tank or a non-mixing (simple storage) tank. Note that other or additional base models could be used depending on the implementation.

Figure 7:
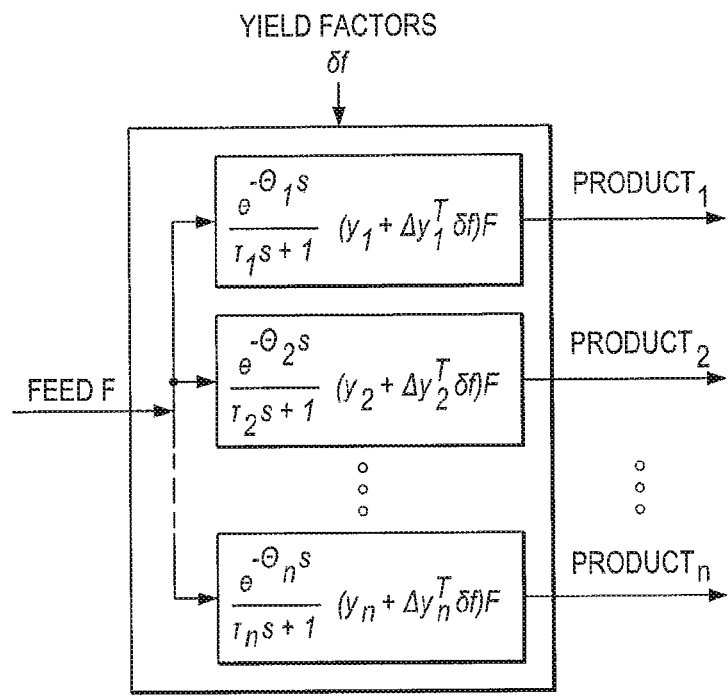
FIGS. 7 through 9 illustrate illustrative base models for forming a planning model in a cascaded MPC architecture.
Figure 8:
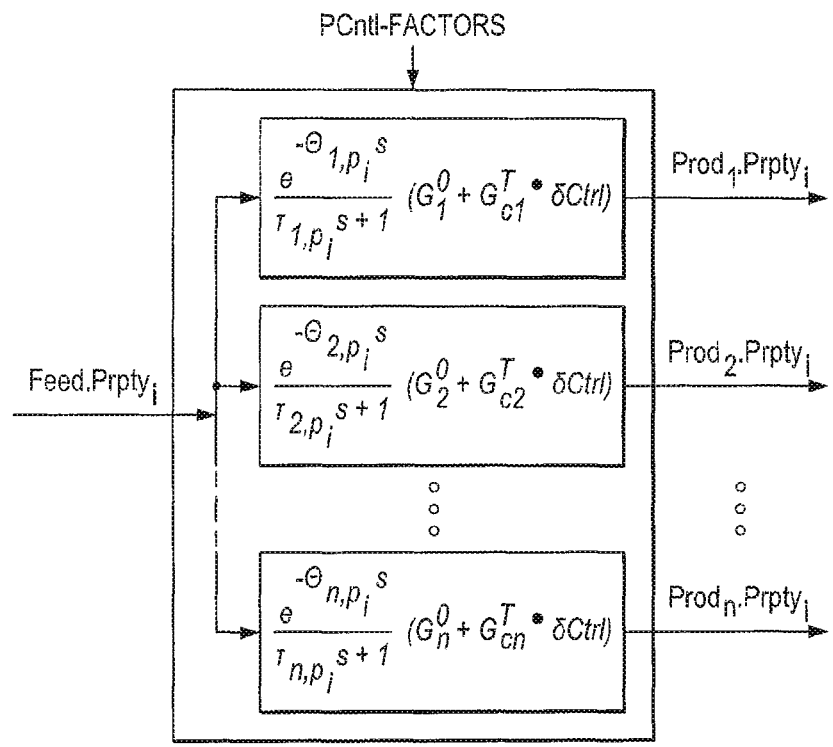
Figure 9:
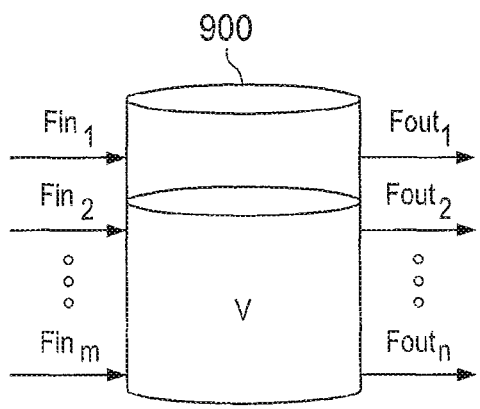

FIGS. 7 through 9 illustrate example base models for forming a planning model in a cascaded MPC architecture according to this disclosure. FIGS. 7 and 8 illustrate an example model for a processing unit, while FIG. 9 illustrates an example model for a pool tank.

As shown in FIG. 7, the following transfer function can be used for material balance between an input feed and multiple output products:

$$\frac{e^{-\theta_i s}}{\tau_i s + 1}(y_i + \Delta y_i^T \delta f) F. \quad (5)$$

Here, $y_i$ is the base yield for the product, and $\Delta y_i$ is a vector (of $m_1$ elements). Also:

$$\Sigma_{i=1}^n y_i = y_i = 1 + vg \quad (6)$$

where vg is the volume gain and where:

$$\Sigma_{i=1}^n \Delta y_{i,j} = 0, \forall \text{ any index } j \quad (7).$$

This model format matches with the structure commonly used in planning models. Strictly speaking, it is not a linear model as it has linear dynamics with quadratic gains. The model has a single input feed per unit, and each property of an output product has a similar time-constant and delay as the product draw. Table 2 illustrates a steady-state gain matrix for a single feed flow, although multiple feeds can be naturally extended using the same approach.

TABLE 2

| | | (1 + m$_1$) MVs | |
|---|---|---|---|
| | | Feed (F) | Y-factors$_{(1 \ldots m1)}$ |
| n CVs | Prod$_1$.Flow | Lumped yield y$_1$ | F · Δyield$_{1, (1 \ldots m1)}$ |
| | ... | | |
| | Prod$_n$.Flow | Lumped yield y$_n$ | F · Δyield$_{n, (1 \ldots m1)}$ |
| n × r CVs | Prod$_1$.Prpty$_1$ | | Gains (y-fac→prpty) |
| | ... | Not time invariant | ... |
| | Prod$_n$.Prpty$_r$ | | Gains (y-fac→prpty) |

Figure 30:
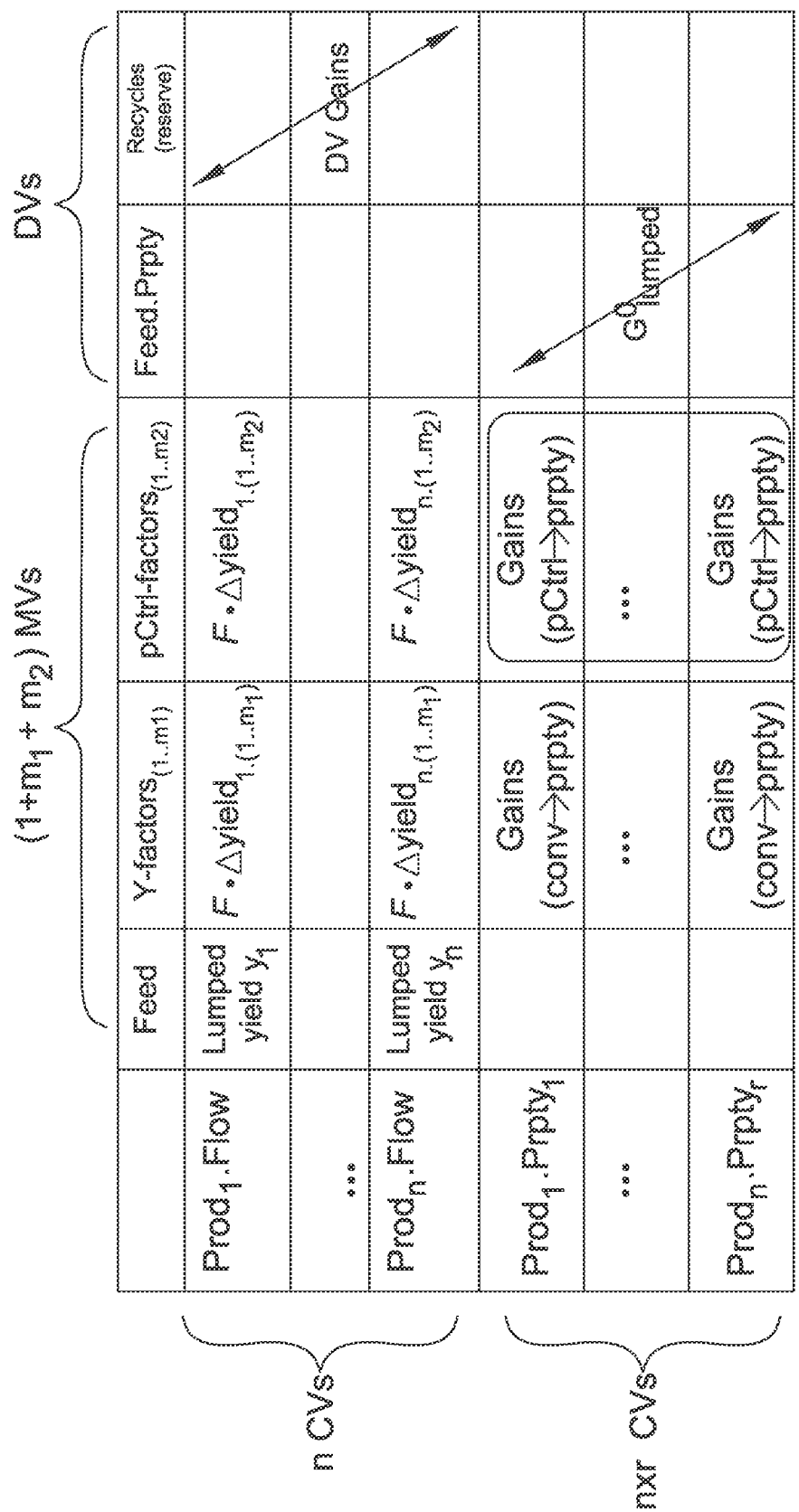
FIG. 30 illustrates a steady-state gain matrix for both material flow and properties of a single feed.

As shown in FIG. 8, the following transfer function can be used for transferring the $i^{th}$ property of an input feed to the $i^{th}$ property of the $j^{th}$ product:

$$\frac{e^{-\theta_{j,p_i} s}}{\tau_{j,p_i} s + 1}(G_j^0 + G_{cj}^T \cdot \delta Ctrl) \quad (8)$$

where $G_{cj}$ is a vector (of $m_2$ elements) and $G^0_j$ is a "passing thru" DV gain. This approach assumes that each property of a product has a similar time-constant and delay as the product draw, and by default they can be set to the same value. This approach also assumes that the properties can be influenced (or controlled) by an MPC controller. FIG. 30 illustrates a steady-state gain matrix for both material flow and properties of a single feed, although again multiple feeds can be naturally extended using the same approach.

Various techniques can be used to obtain the dynamics of a processing unit model defined in this manner. For example, the dynamics can be estimated from historical data and validated with engineering knowledge, identified during brief step-testing, or estimated during operation. Bias updating and yield validation could also occur, such as when lumped yields (rather than base yields) of a processing unit are updated in real-time. Various error-correction schemes can also be used with master MPC controller planning models. In a first error-correction scheme, the yield can be calculated directly from the input flow, and the average yield (within a past time window) can be estimated and used to predict a future average yield over a similar time window (the width of the window can be tunable). Note that the estimated yield may need to pass an internal predictability threshold (possibly tunable) before the lumped-yield value is updated. Gain updating can improve model prediction accuracy, and a validated gain could have a better predictability on the future lumped yield. In a second error-correction scheme, a bias updating mechanism can be used to update the bias inside the master MPC model prediction.

FIG. 9 illustrates an example modeling of a general pool tank 900. A pool tank 900 denotes a structure used to store material (such as one or more intermediate products) being manufactured in a facility. The storage tanks 210 shown in FIG. 2A above are examples of pool tanks. Multiple streams of materials (Fin) flow into the tank 900, and each stream has r properties. Also, multiple streams of materials (Fout) flow out of the tank 900, and all streams have the same properties.

The current volume is denoted V, and an assumption can be made that input streams with similar properties are pooled together in a pool tank 900. Note that the model described below is for tanks used for pooling intermediate products and may or may not be suitable for final product blending. Also note that the input streams can be similar enough so that a linear mixing rule is accurate enough for measurement feedback, although other approaches (such as those using a nonlinear correction term or nonlinear blending laws) could be used.

In the model of the pool tank 900, the following material balance equation could be used:

$$\frac{dV}{dt} = \sum_{k=1}^{m} F_{in_i} - \sum_{k=1}^{n} F_{out_i}. \qquad (9)$$

The following equations can be used to represent blending of the $i^{th}$ volumetric property:

$$\frac{d(p_j^{Tank} V)}{dt} = \sum_{k=1}^{m} p_{j,i} F_{in_i} - p_j^{Tank} \sum_{k=1}^{n} F_{out_i} \qquad (10)$$

$$p_j^{Tank} \frac{dV}{dt} + V \frac{dp_j^{Tank}}{dt} = \sum_{k=1}^{m} p_{j,i} F_{in_i} - p_j^{Tank} \sum_{k=1}^{n} F_{out_i} \qquad (11)$$

$$V \frac{dp_j^{Tank}}{dt} = \sum_{k=1}^{m} (p_{j,i} - p_j^{Tank}) F_{in_i}. \qquad (12)$$

The following can be obtained using Laplace transforms and reorganizing:

$$G_{p_j}(s) = \frac{\sum_{k=1}^{m} p_{j,i} F_{in_i}}{V \cdot s + \sum_{k=1}^{m} F_{in_i}} = \frac{(1/F_{Tin}) \sum_{k=1}^{m} p_{j,i} F_{in_i}}{\tau_v \cdot s + 1}. \qquad (13)$$

Blending bonuses can also be used in an oil and gas system as follows:

$$G_{p_j}(s) = \frac{(1/F_{Tin}) \left\{ \sum_{k=1}^{m} p_{j,i} F_{in_i} + (1/F_{Tin}) \Sigma_{i,k} b_{j,k} F_{in_i} F_{in_k} \right\}}{\tau_v \cdot s + 1}. \qquad (14)$$

FIG. 31 summarizes the modeling of a general pool tank. Assumptions here include that the input flows vary more frequently than their properties do and that input-output variables can be adequately measured (either in an automated manner or in a laboratory).

Among other things, the benefits of using base model structures include designing a limited number of base structures (such as two in the example above), where the base structures provide flexibility in terms of how the units and tanks are connected. For example, processing units and pool tanks could be fixed after configuration, and the states of inventory volumes/properties can be tracked dynamically. Connections between processing units and pool tanks could be stateless and changed on-the-fly. Moreover, a planning model for master MPC controllers can be constructed on the fly. In addition, the cascaded architecture can easily take advantage of intermediate feedback as long as intermediate input-output signals can be adequately measured, and this approach can support improved model updating as its structure aligns more naturally with real processing units.

Model Validation Technique

Figure 10:
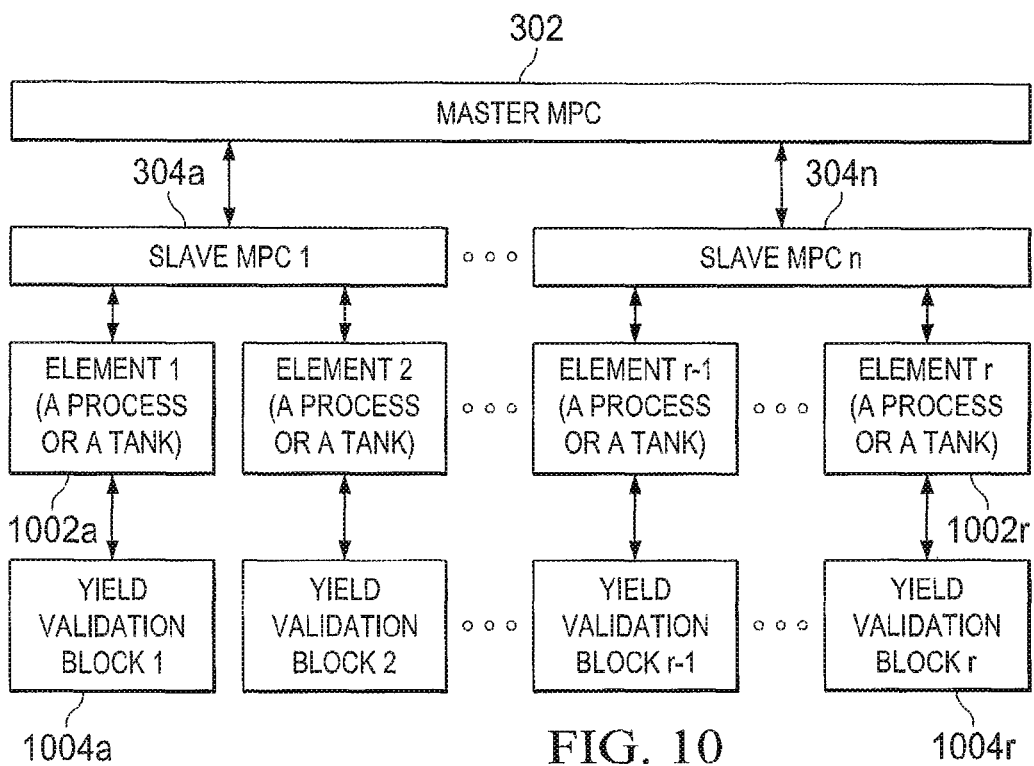
FIG. 10 illustrates an illustrative technique for validating a planning model in a cascaded MPC architecture.

A master MPC controller 302 or other component of a control and automation system can implement a validation technique in order to validate a planning model to be used by the master MPC controller 302. FIG. 10 illustrates an example technique for validating a planning model in a cascaded MPC architecture according to this disclosure. In FIG. 10, a hierarchy of controllers and other devices is shown, where each slave MPC controller 304a-304n is associated with at least one process element (a processing unit or a pool tank) 1002a-1002r. Each process element 1002a-1002r has an associated yield validation block 1004a-1004r, respectively.

Among other things, the yield validation blocks 1004a-1004r support model validation involving envelope calculations of material balances, energy balances, product properties or other modeling updates. A planning model can be validated by checking that material, energy, or other factors are balanced in the model. Envelope calculations can be done in weight or equivalent values, and the results can be presented in different units based on the user's choice (such as weight or volume). Temperature/density correction factors can be used, and values can be converted to common units (such as barrels or tons). The conventions commonly used in material accounting in a specific industry could be supported.

Various other design issues can be considered in the validation. For example, some measurements can be intermittent, incomplete, non-periodic, missing, delayed, or partly nonexistent, and a scheme (such as filtering or bias-updating) can be used for dealing with such anomalies. Also, in some cases, material may not be balanceable when there is an (unplanned or unmeasured) off-specification material recycle, which could be handled in any suitable manner (such as based on user input). In addition, the yields of some streams may differ significantly from their "normal" values for a period of time due to maintenance or abnormal process conditions, which again could be handled in any suitable manner (such as based on user input).

The yield validation blocks 1004a-1004r can also support bias updating and yield validation of lumped yields as described above. For example, the yield validation blocks 1004a-1004r could measure real-time yields and cross-validate them by applying material balance and volume/temperature corrections. The yield validation blocks 1004a-1004r could also perform the first error-correction scheme described above.

Techniques for Handling Master-Slave Variables

Figure 12:
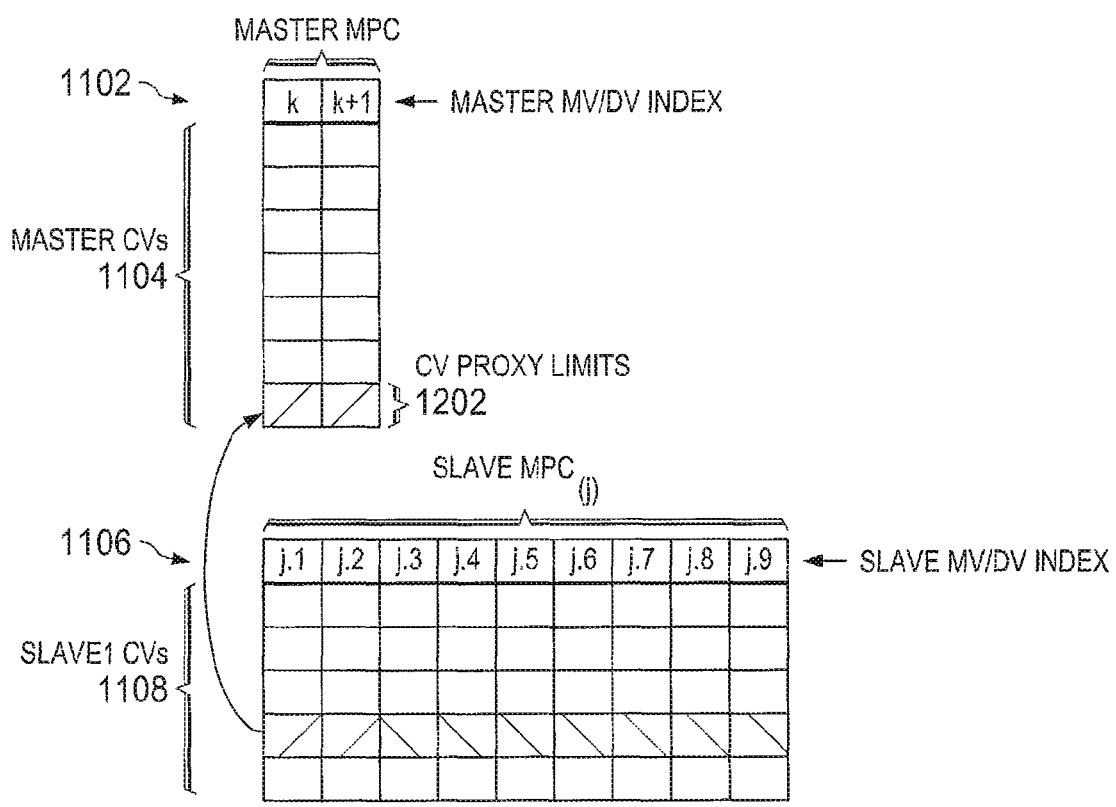
FIGS. 11 and 12 illustrate an illustrative technique for linking variables in a master MPC controller and slave MPC controllers in a cascaded MPC architecture.
Figure 11:
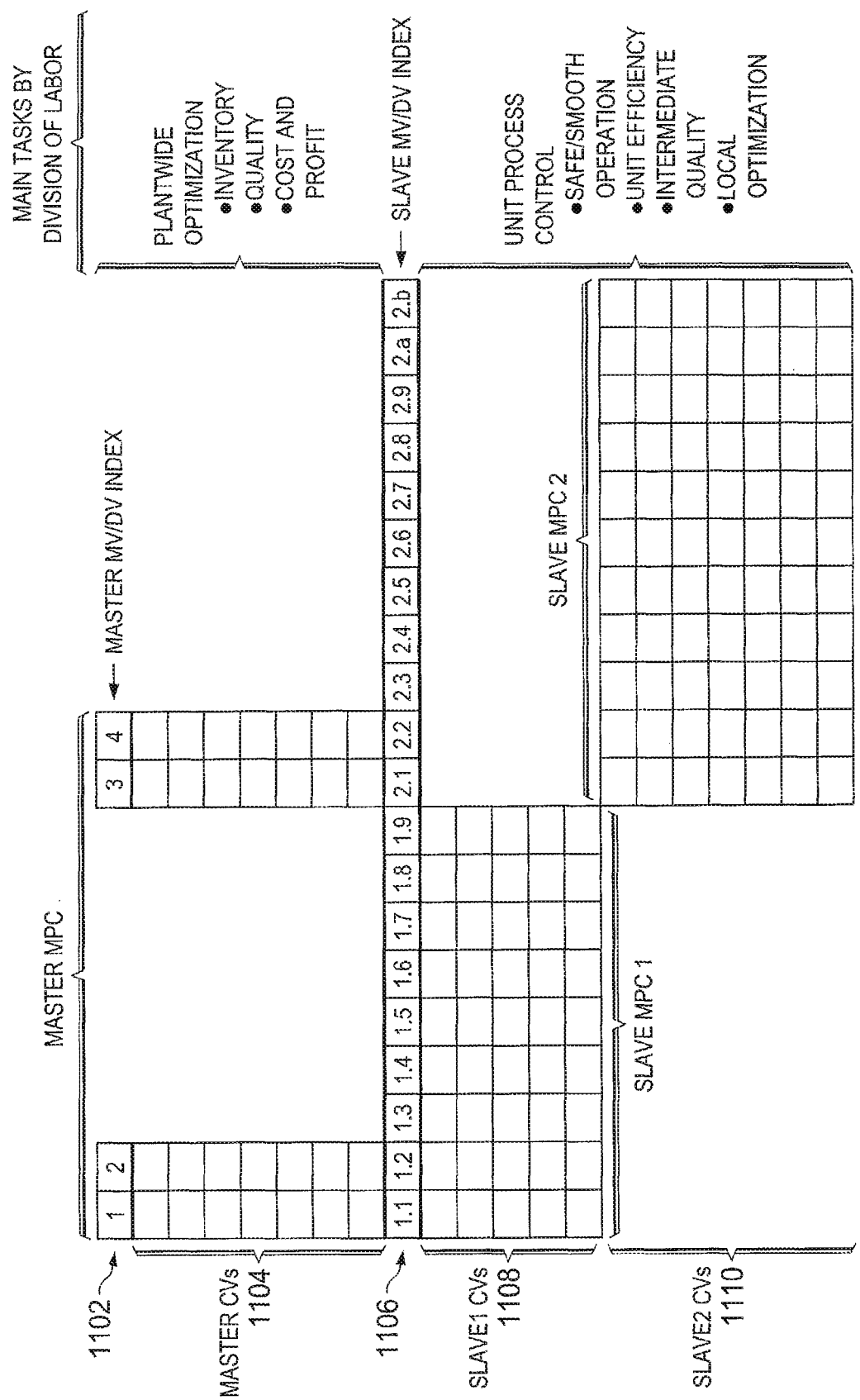

The proxy limits described above allow constraints from slave MPC controllers 304a-304n to be passed to a master MPC controller 302. FIGS. 11 and 12 illustrate an example technique for linking variables in a master MPC controller and slave MPC controllers in a cascaded MPC architecture according to this disclosure. This technique allows the master MPC controller 302 to consider the constraints of the slave MPC controllers 304a-304n during its operation. Note, however, that other approaches could be used.

As shown in FIG. 11, the master MPC controller 302 has an MV/DV index 1102 that identifies different MVs or DVs used by the master MPC controller 302. Various CVs 1104 controlled by the master MPC controller 302 can be affected by those MVs or DVs. There is also an MV/DV index 1106 that identifies different MVs or DVs used by the slave MPC controllers 304a-304b. Various CVs 1108-1110 controlled by the slave MPC controllers 304a-304b can be affected by those MVs or DVs. A conjoint variable represents the same variable in both a master MPC controller and a slave MPC controller (such as MV4 in the master controller and MV9 in the slave controller as described above). Conjoint variables can be configured as either MVs or DVs in master and slave MPC controllers.

Master and slave CV constraints can be coupled by associating a value in the MV/DV index 1102 with a corresponding value in the MV/DV index 1106. This indicates that the variable identified by the MV/DV index 1102 and the MV/DV index 1106 is a conjoint variable. This allows the plantwide optimization of the master MPC controller 302 to include some or all of the CV constraints from the slave MPC controllers 304a-304b.

As shown in FIG. 12, when the slave MPC model matrix is sparse, at least one CV of a slave MPC controller can be "elevated" to a master MPC controller via a proxy limit. The proxy limit appears in the column(s) of the MV/DV index 1102 associated with the corresponding column(s) of the MV/DV index 1106. For example, assume a CV constraint in the slave MPC controller is expressed as:

$$\underline{CV_i} \leq \Sigma_{t=1}^{n} a_{i,t} x_t \leq \overline{CV_i} \qquad (15).$$

This CV constraint can be used as a CV proxy limit in the master MPC controller using the expression:

$$\min_{x_{free}}\{\underline{CV_i} - \sum a_{i,free} x_{free}\} \leq \sum a_{i,c} x_{conjoint} \leq \max_{x_{free}}\{\overline{CV_i} - \sum a_{i,free} x_{free}\}. \quad (16)$$

This represents one example way in which the constraint of a slave MPC controller can be passed to and used by a master MPC controller.

Example Methodology

Figure 13:
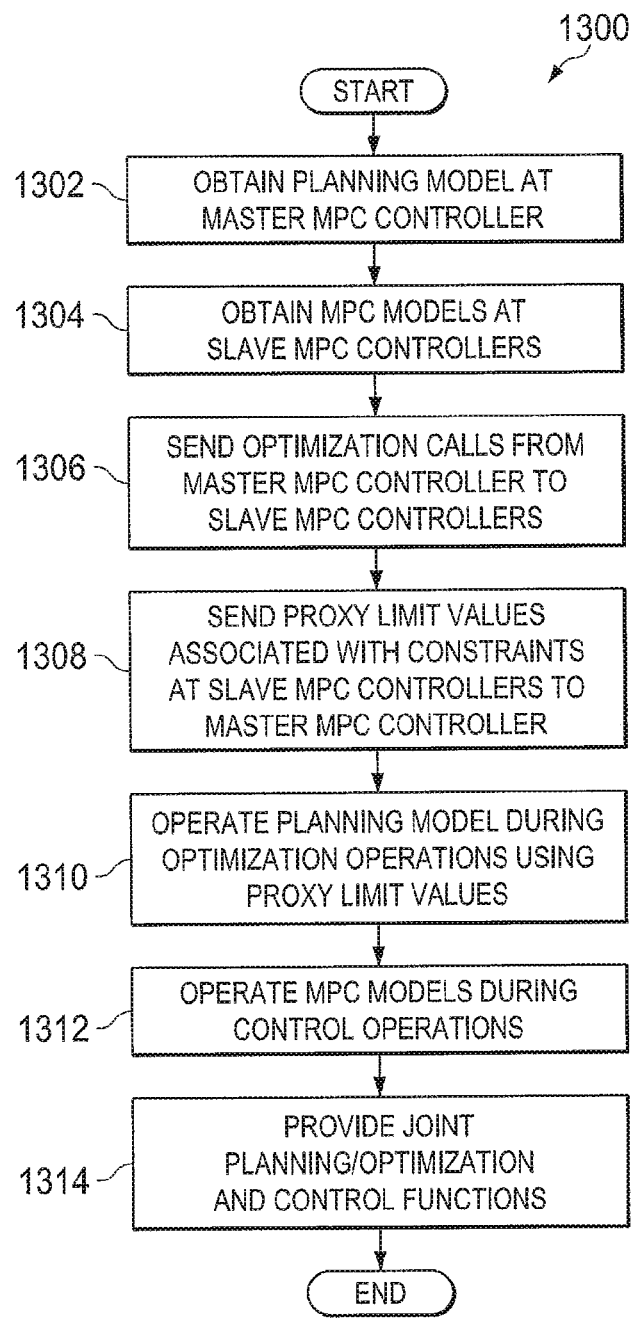
FIG. 13 illustrates an illustrative method for using cascaded MPC controllers in an industrial process control and automation system.

FIG. 13 illustrates an example method 1300 for using cascaded MPC controllers in an industrial process control and automation system according to this disclosure. For ease of explanation, the method 1300 is described with respect to the cascaded MPC architecture 300, which could operate in the control and automation system 100. The method 1300 could be used with any other suitable cascaded MPC architecture and in any other suitable system.

As shown in FIG. 13, a planning model is obtained at a master MPC controller at step 1302, and MPC models are obtained at slave MPC controllers at step 1304. This could include, for example, generating a planning model 200 or re-using an existing planning model 200, such as a single-period planning model. This could also include generating MPC models 250, such as by using standard techniques.

During operation of the cascaded MPC architecture, inquiry optimization calls are sent from the master MPC controller to the slave MPC controllers at step 1306. The inquiry optimization calls could request that the slave MPC controllers determine whether (and to what extent) certain changes could be made to their MV values without violating their constraints. The slave MPC controllers respond by sending proxy limit values associated with their constraints to the master MPC controller at step 1308. This could include, for example, the slave MPC controllers identifying to what extent certain changes could be made to their MV values and which constraints might be violated. Additional details regarding these functions are provided below.

The planning model is operated by the master MPC controller during optimization operations using the proxy limit values at step 1310. This could include, for example, the master MPC controller combining the proxy limit values from multiple slave MPC controllers in the master MPC controller's control and economic optimization formulations. At the same time, the MPC models are operated by the slave MPC controllers during control operations at step 1312. This could include, for example, the slave MPC controllers performing standard MPC functions, where those functions are based on the control and economic optimization formulations generated by the master MPC controller. In this way, joint planning/optimization and control functions can occur in the control and automation system at step 1314.

Although FIG. 13 illustrates one example of a method 1300 for using cascaded MPC controllers in an industrial process control and automation system, various changes may be made to FIG. 13. For example, while shown as a series of steps, various steps in FIG. 13 could overlap, occur in parallel, occur in a different order, or occur any number of times.

Feasibility Region Estimation

Figure 14:
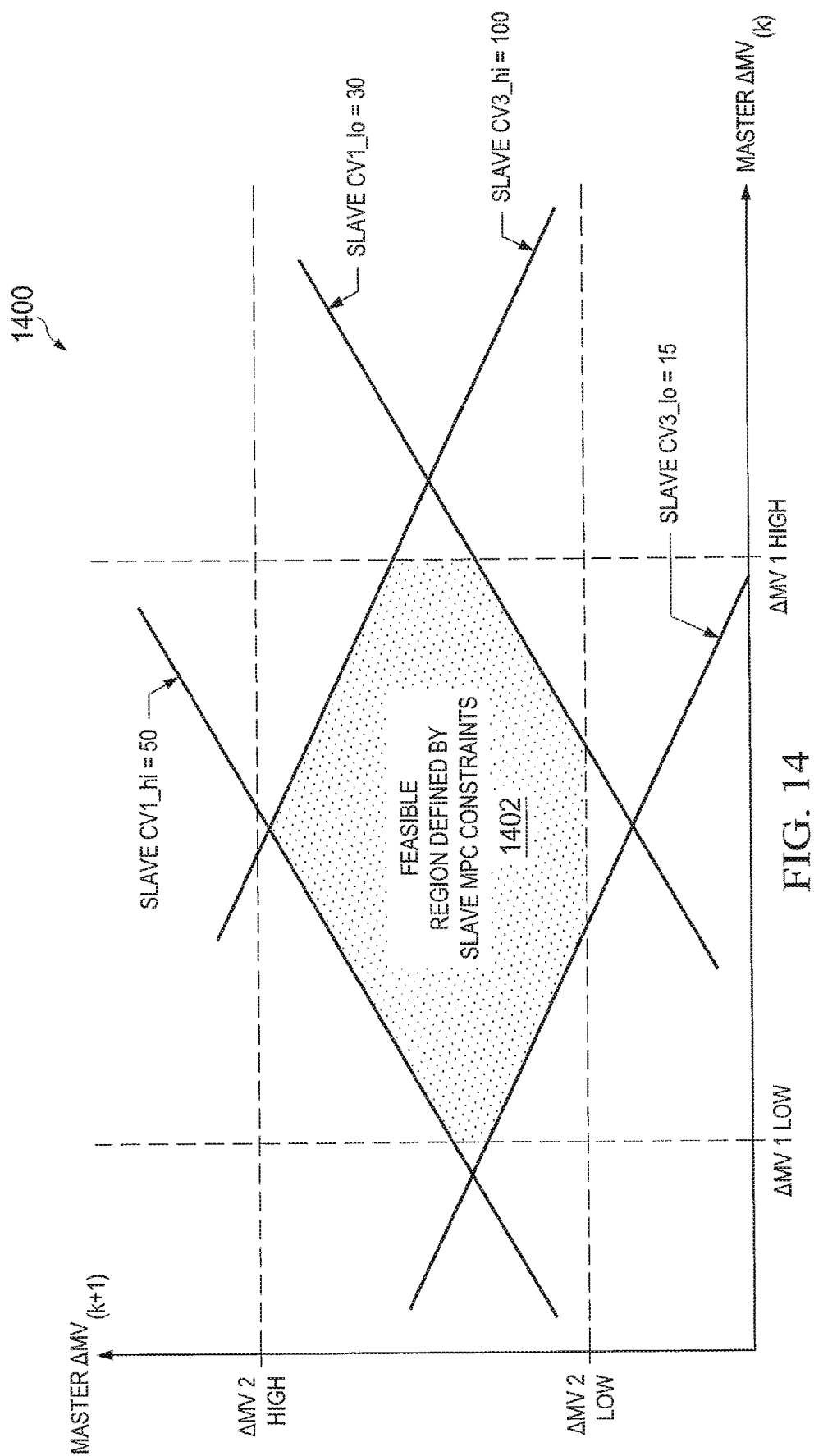
FIGS. 14 through 18 illustrate illustrative techniques for generating proxy limits associated with a feasibility region to support cascaded MPC.

FIGS. 14 through 18 illustrate example techniques for generating proxy limits associated with a feasibility region to support cascaded MPC according to this disclosure. The constraint of a slave MPC controller could be incorporated into the planning operations of a master MPC controller in any suitable manner. For example, FIG. 14 shows that if the free MVs of a slave MPC controller are fixed at their current values, the slave controller's CV constraints can be plotted in the master controller's MV space 1400. The slave controller's MV limits appear as simple bounds in the master controller's MV space 1400, and the slave controller's CV limits appear as linear constraints in general. A feasibility region 1402 between these limits defines the possible combinations of values that could be selected by the master MPC controller while satisfying all constraints of the slave MPC controller. The shape of the feasibility region 1402 defined by the slave controller's constraints is generally a polygon or polyhedron.

Figure 15:
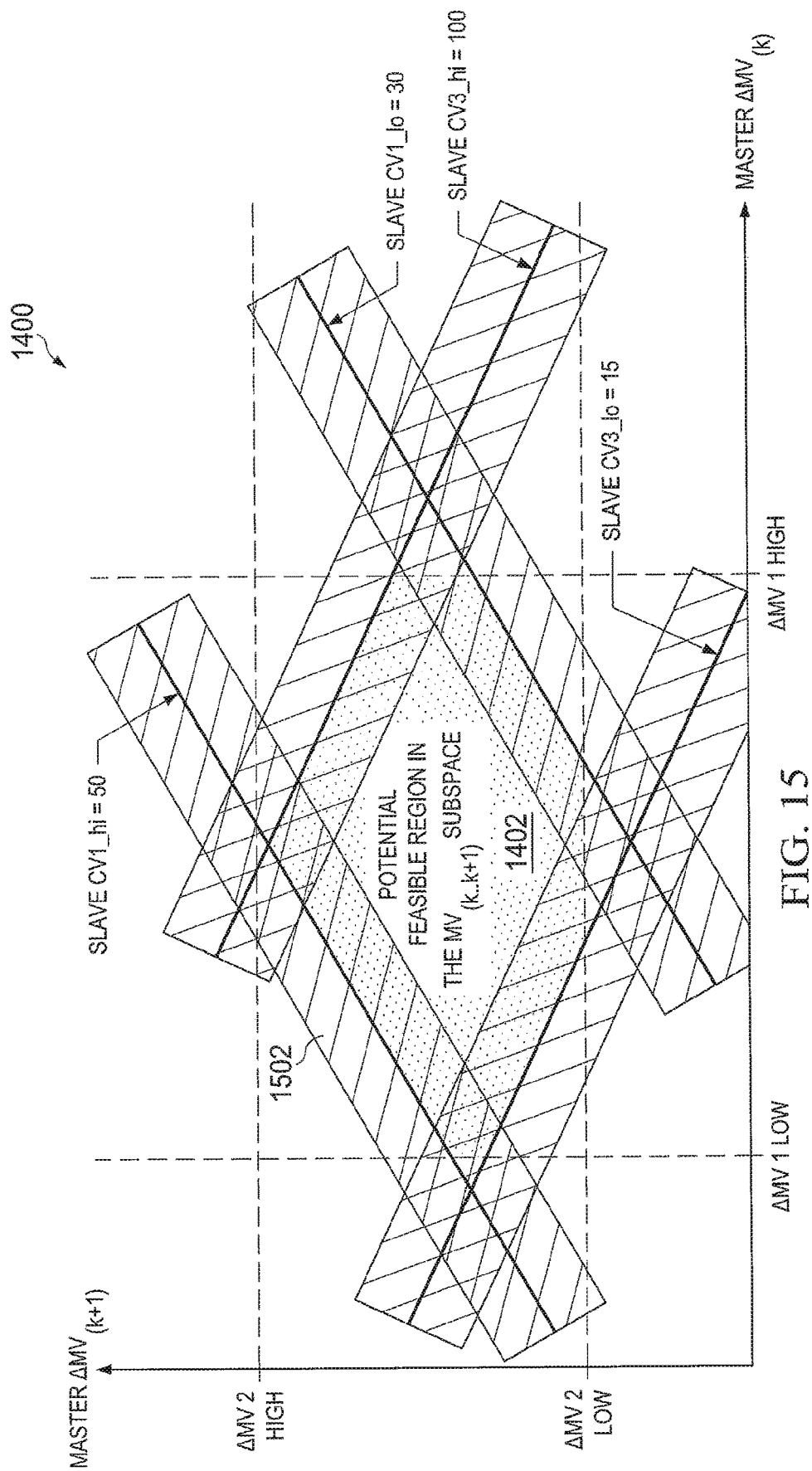

As shown in FIG. 15, if the free MVs of the slave MPC controller take other values (for any reason), the shape of the feasibility region 1402 changes. The shaded bars 1502 indicate how these constraints may shift. Similarly, if the slave controller's model gains are updated on-the-fly, the slope of these CV constraints may change accordingly.

Figure 16:
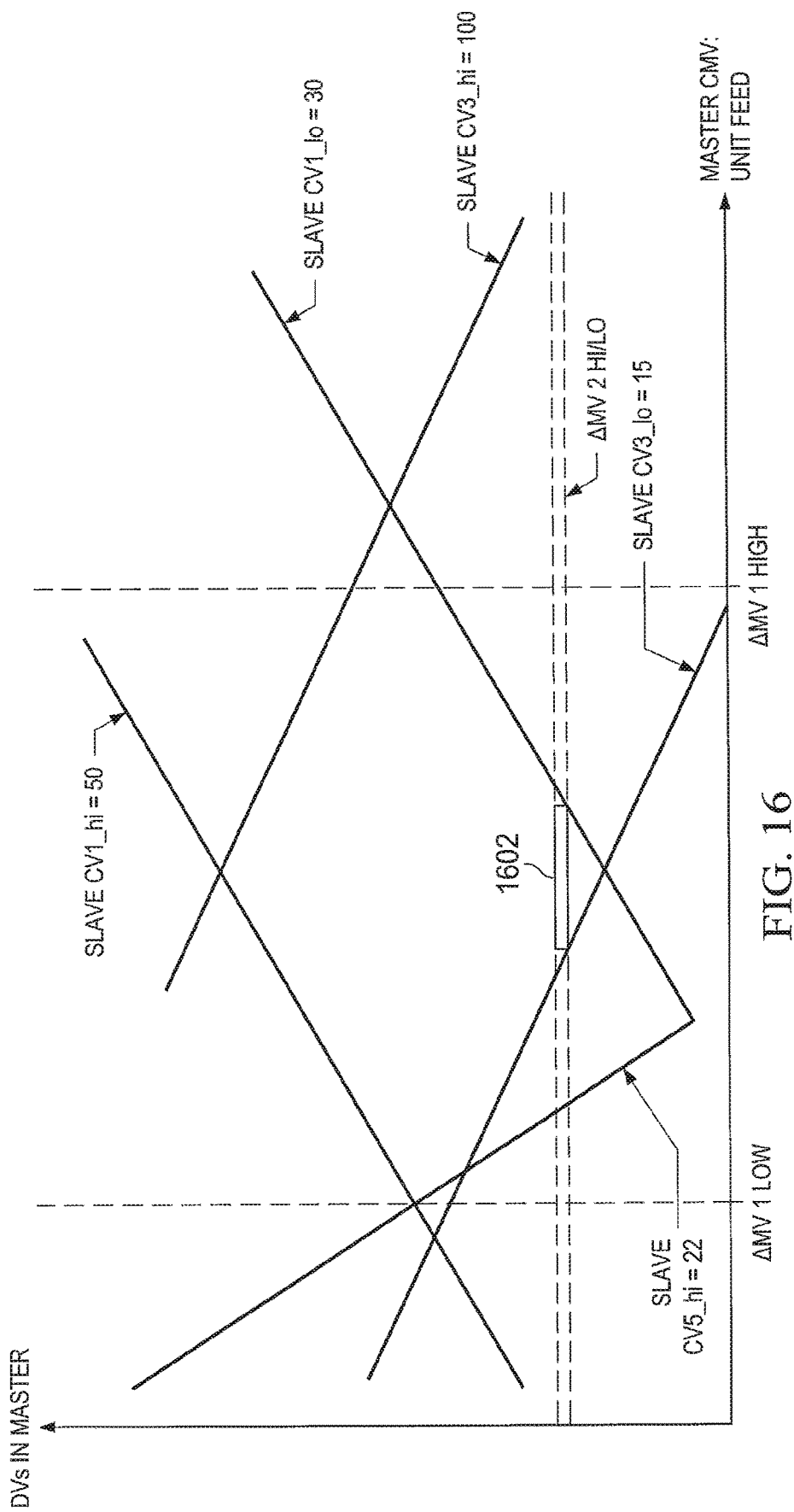

If there is a single conjoint variable between a master MPC controller and a slave MPC controller, the feasibility region 1402 can be reduced in size, such as to the feasibility region 1602 shown in FIG. 16. This can be accomplished when there is a desire to push a MV/DV of the master MPC controller in a given direction by making small changes at a time. In that case, only a narrow band of the feasibility space is used. The high and low values of this feasibility region 1602 can be calculated by finding suitable locations for the free slave controller's MVs. The maximum high value can be computed by an inquiry optimization call from the master controller for the slave controller to maximize its MV2 value. The minimum low value can be computed by an inquiry optimization call from the master controller for the slave controller to minimize its MV2 value. The maximizing objective function can be augmented to include the contribution values of products and other local optimizing components. With contribution values, a unit can be pushed to a more profitable yield profile.

Figure 17:
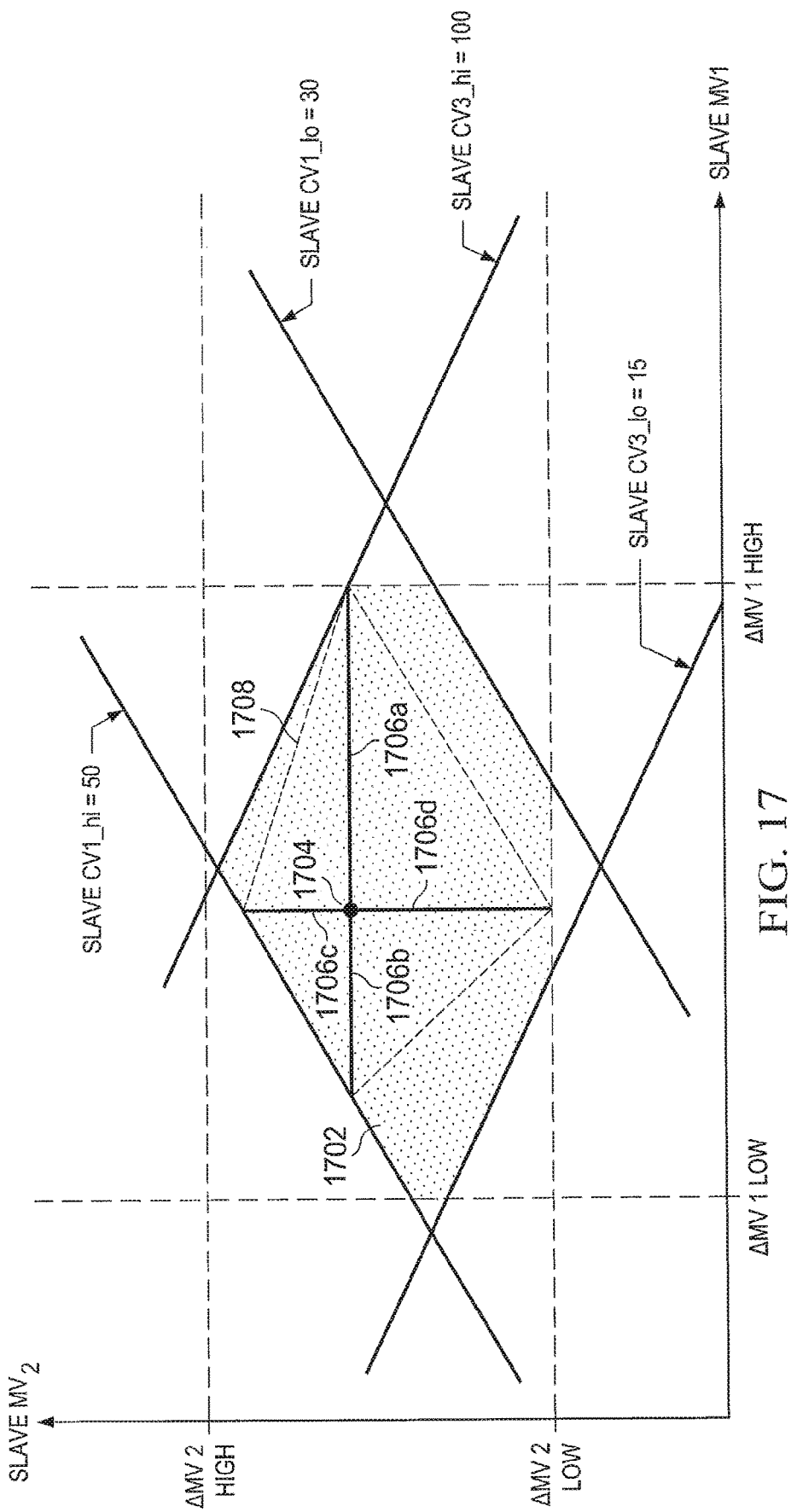

If there are two or more conjoint variables between a master MPC controller and a slave MPC controller, a feasibility region 1702 can be defined as shown in FIG. 17. Again, the feasibility region 1702 represents a polygon or polyhedron defined by the various MV and CV limits of the slave MPC controller. Any point inside the feasibility region 1702 can be used to create an optimization solution that is feasible and can be implemented by the slave MPC controller. The current values of the MVs in the slave MPC controller define a current MV point 1704, which is within the feasibility region 1702.

Using the current MV point 1704, the master MPC controller can estimate the shape of the feasibility region 1702 as follows. In each of multiple directions 1706a-1706d, the master MPC controller makes an inquiry optimization call for the slave controller to maximize or minimize its MV1 or MV2 value. For example, in the direction 1706a, the master MPC controller makes an inquiry optimization call for the slave controller to maximize its MV1 value. In the direction 1706b, the master MPC controller makes an inquiry optimization call for the slave controller to minimize its MV1 value. In the direction 1706c, the master MPC controller makes an inquiry optimization call for the slave controller to maximize its MV2 value. In the direction 1706d, the master MPC controller makes an inquiry optimization call for the slave controller to minimize its MV2 value. The four points identified by these inquiry optimization calls define an estimated feasibility region 1708, which can be used by the master MPC controller when performing planning optimization. In this way, the master MPC controller helps to ensure that an identified solution can be implemented by the slave MPC controller.

Figure 18:
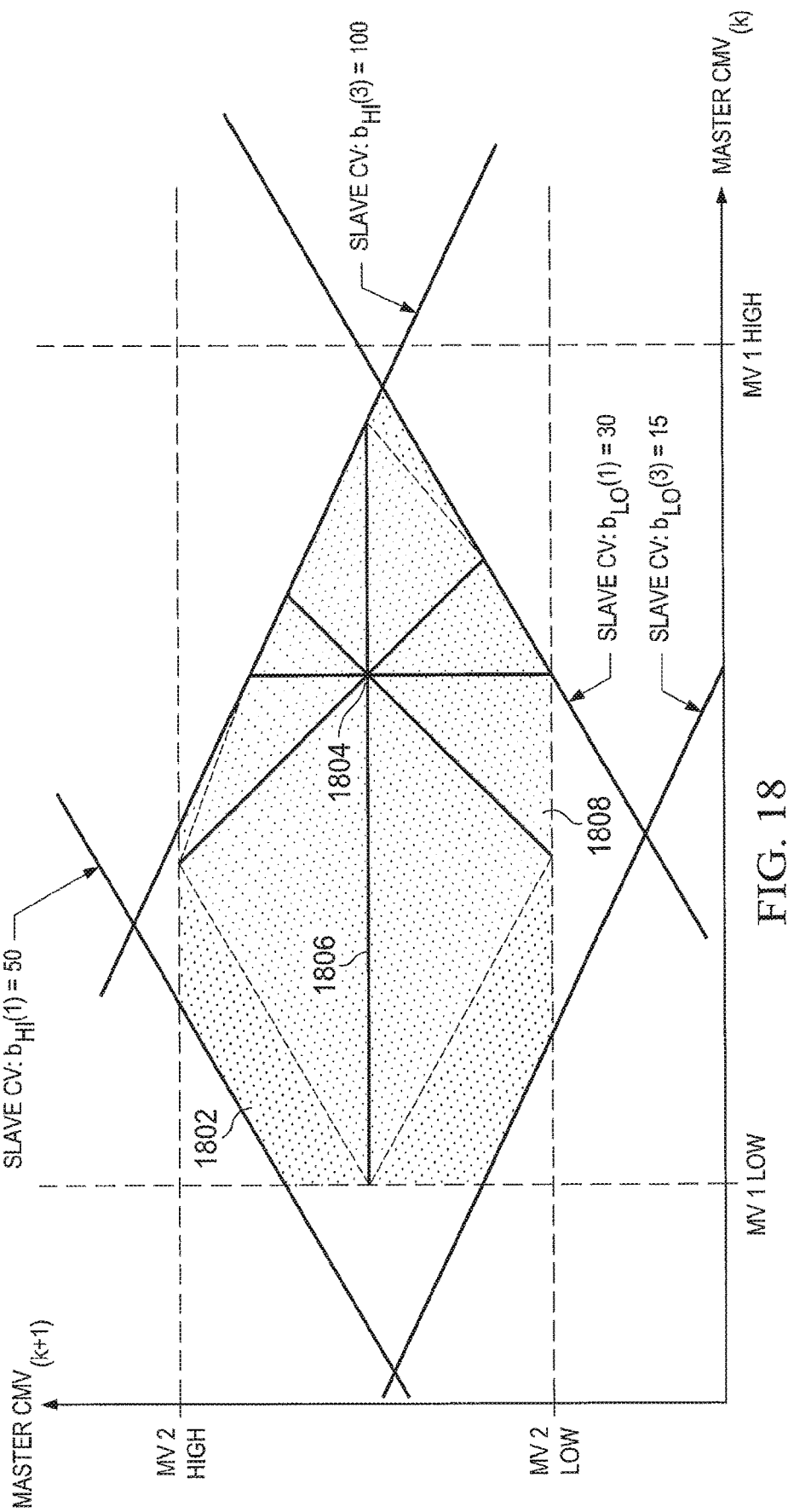

Note that in FIG. 17 the master MPC controller makes inquiry optimization calls associated with four different directions. However, the number of inquiry optimization calls and the directions associated with those inquiry optimization calls could vary. In general, as long as the master MPC controller makes inquiry optimization calls associated with three or more directions, the master MPC controller can identify a multi-dimensional space within the feasibility region of a slave MPC controller. In FIG. 18, for example, a current MV point 1804 is within a feasibility region 1802 of a slave MPC controller. The master MPC controller makes inquiry optimization calls associated with eight directions 1806, which are at 45° intervals. The results of these inquiry optimization calls define an estimated feasibility region 1808, which again can be used by the master MPC controller.

In some embodiments, the inquiry optimization calls and associated functions could be implemented as follows. In response to an inquiry optimization call, a slave MPC controller is requested to minimize the following:

$$\min_x c^t x_{conj} \quad (17)$$

$$b_{LO} \leq A_c x_{conj} + A_f x_{free} \leq b_{HI} \quad (18)$$

$$d^t x_{conj} = 0 \quad (19)$$

where:

$$A = \begin{bmatrix} G \\ I \end{bmatrix}. \quad (20)$$

In a particular implementation of the example shown in FIG. 18, the master MPC controller could make the eight inquiry optimization calls shown in Table 5 with the various values for the $c^t$ and $d^n$ values.

TABLE 5

| Call # | $c^t$ | | $d^t$ | |
|---|---|---|---|---|
| 1 | −1 | 0 | 0 | 1 |
| 2 | 1 | 0 | 0 | 1 |
| 3 | 0 | −1 | 1 | 0 |
| 4 | 0 | 1 | 1 | 0 |
| 5 | −1 | 1 | 1 | 1 |
| 6 | 1 | −1 | 1 | 1 |
| 7 | 1 | 1 | 1 | −1 |
| 8 | −1 | −1 | 1 | −1 |

The first four calls in Table 5 could be used to make the inquiry optimization calls shown in FIG. 17.

Note that the inquiry optimization calls shown in Table 5 define the directions to be at 45° intervals. However, the inquiry optimization calls can be expanded to define any suitable direction as follows.

TABLE 6

| Call # | $c^t$ | $d^t$ |
|---|---|---|
| $i^{th}$ call | Any vector | $c^{t\perp}$ |

Here, $c^{t\perp}$ is defined as the null space of the vector $c^t$. This definition allows an inquiry optimization call to occur in any desired direction, and up to n inquiry optimization calls could be made by the master MPC controller for a particular current MV point.

The value returned in response to each inquiry optimization call can be used as a proxy constraint by the master MPC controller as shown in FIG. 12. For example, up to four proxy constraints can be used by the master MPC controller in FIG. 17, and up to eight proxy constraints can be used by the master MPC controller in FIG. 18. These proxy constraints allow the master MPC controller to ensure that any solution identified by the master MPC controller falls within the actual feasibility region of the slave MPC controller.

The approach described above provides a general method for approximating the feasible space defined by the CV/MV constraints of a slave MPC controller. This approach works regardless of the shape of the actual feasibility space of the slave MPC controller or the number of constraints in the slave MPC controller. However, it is also possible to select the direction associated with a particular inquiry optimization call to help more closely estimate the actual feasibility region of a slave MPC controller. For example, the direction associated with a particular inquiry optimization call can be selected to be substantially perpendicular to a nearby CV or MV limit of the slave MPC controller. This could be particularly useful when a CV constraint of the slave MPC controller is approaching its bound, and the inquiry optimization call can be made specifically to represent that CV constraint. The inquiry optimization calls here could be defined as shown in Table 7.

TABLE 7

| Call # | $c^t$ | $d^t$ |
|---|---|---|
| $i^{th}$ call | $a_{j,\,conj}$ | $a_{j,\,conj}^\perp$ |
| $i+1^{th}$ call | $-a_{j,\,conj}$ | $a_{j,\,conj}^\perp$ |

Here, $a_j^\perp$ is defined as the null space of $a_j$.

Note that while only one or two conjoint variables are described above, the approach described here could be extended to any number of conjoint variables. This approach allows the master MPC controller to consider the constraints of each of its slave MPC controllers while optimizing operations of a plant with a feasibility region defined by those constraints. Also note that while the CV/MV limits of the slave MPC controller are shown here as being plotted in two dimensions, the feasibility region for the slave MPC controller could be defined in more than two dimensions. Inquiry optimization calls could be made in more than two dimensions to define a multi-dimensional space that estimates the multi-dimensional feasibility region.

Figure 19:
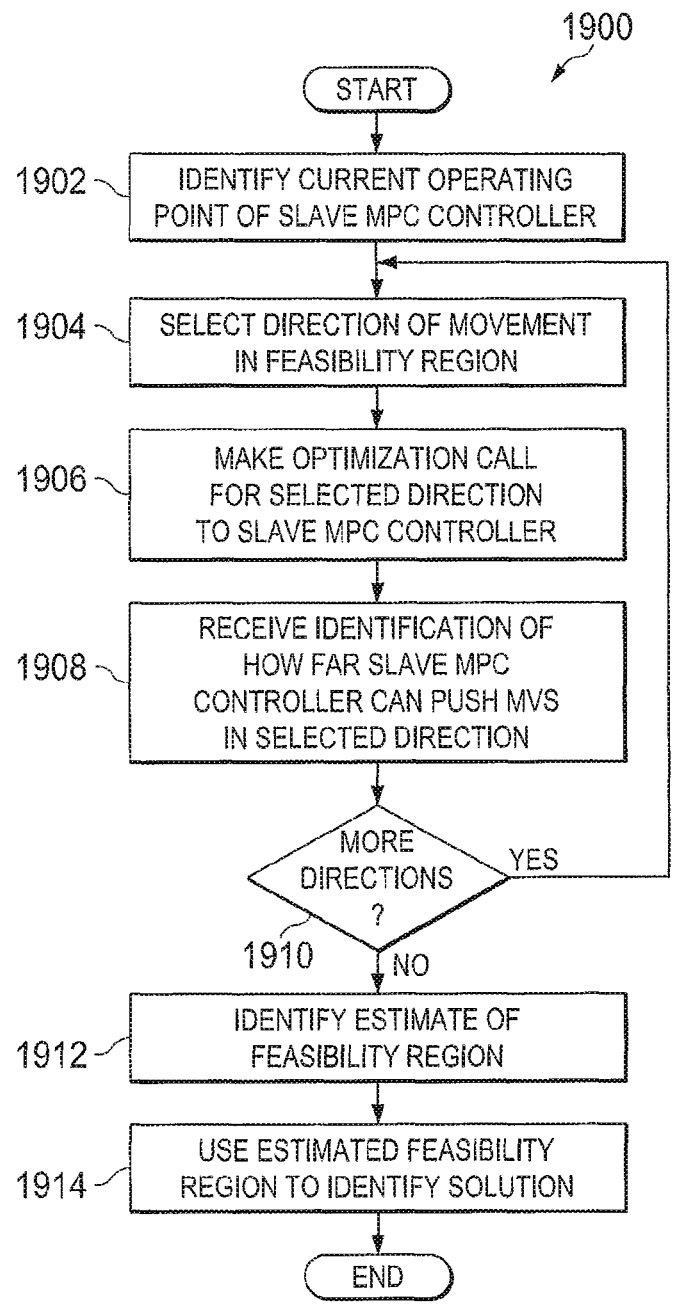
FIG. 19 illustrates an illustrative method for calculating proxy limits to support cascaded MPC.

FIG. 19 illustrates an example method 1900 for calculating proxy limits to support cascaded MPC according to this disclosure. In particular, the method 1900 can be used to estimate the feasibility region of a slave MPC controller at a master MPC controller. As shown in FIG. 19, the current operating point of a slave MPC controller is identified at step 1902. This could include, for example, the processing device in the master MPC controller 302 identifying the current MV values of a slave MPC controller 304a-304n.

A direction of movement from the current operating point of the slave MPC controller is selected at step 1904. This could include, for example, the processing device in the master MPC controller 302 selecting a predefined direction or a direction that is perpendicular to a line defining an MV/CV limit of the slave MPC controller 304a-304n. An inquiry optimization call is made to the slave MPC controller to identify how far one or more MVs of the slave MPC controller can be pushed in the selected direction at step 1906, and an identification of how far the one or more MVs of the slave MPC controller can be pushed in the selected direction is received at step 1908. This could include, for example, the processing device in the master MPC controller 302 requesting that the slave MPC controller 304a-304n identify how far the slave MPC controller 304a-304n can push one or more MVs in the selected direction without violating any constraint and receiving an identification from the slave MPC controller 304a-304n. In other words, the slave MPC controller 304a-304n is identifying its proxy limit in the selected direction. If more directions remain to be tested at step 1910, the process returns to step 1904 to select another direction and issue another inquiry optimization call.

Once all directions are queried, an estimate of the feasibility region of the slave MPC controller is generated at step 1912. This could include, for example, the processing device in the master MPC controller 302 identifying a multi-dimensional space defined by the proxy limits from the slave MPC controller 304a-304n. This estimated feasibility region is used by the master MPC controller to identify a planning optimization solution at step 1914. The solution identified by the master MPC controller 302 will be feasible for the slave MPC controller 304a-304n since the estimated feasibility region identified by the master MPC controller 302 is within the actual feasibility region associated with the slave MPC controller 304a-304n.

Although FIG. 19 illustrates one example of a method 1900 for calculating proxy limits to support cascaded MPC, various changes may be made to FIG. 19. For example, while shown as a series of steps, various steps in FIG. 19 could overlap, occur in parallel, occur in a different order, or occur any number of times.

Figures 20, 21:
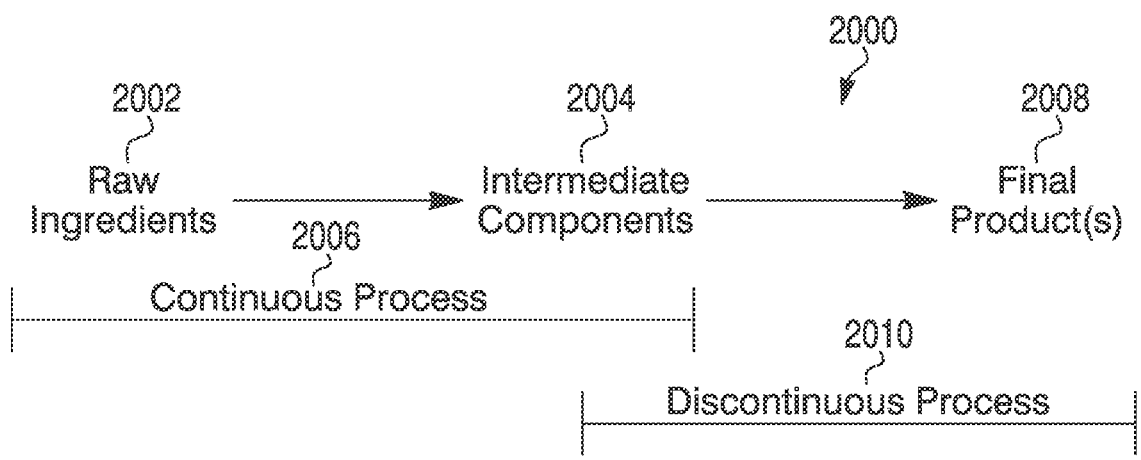
FIG. 20 is a schematic illustration of continuously producing intermediate components and non-continuously producing products from the intermediate components.
FIG. 21 is a schematic illustration of an illustrative product lifting specification.

FIG. 20 is a schematic illustration of a process 2000 for ultimately converting raw ingredients into finished products. In some instances, raw ingredients 2002 may be converted into intermediate components 2004 in a continuous process 2006. The intermediate components 2004 may then be converted into final products 2008 in a discontinuous process 2010. It will be appreciated that the discontinuous process 2010 may occur in a batch fashion, or parts of the discontinuous process 2010 may occur in a batch fashion. In some instances, parts of the discontinuous process 2010 may occur in a continuous or assembly-line fashion, but may occur over a different time frame than the continuous process 2006.

It will be appreciated that much of this disclosure pertains to the production of petroleum products from blending components that are produced from petroleum stocks. Some of all of these blending components may be considered as being distillation column products. The raw ingredients 2002 may be crude oil, which can of course vary considerably in its individual molecules and molecular distribution, may enter a distillation column at an oil refinery or related facility. A variety of different blends of molecules may be pulled off of the distillation column. Relatively lighter blends (smaller molecular weight molecules) may be pulled off towards the top of the distillation column while relatively higher blends (larger molecular weight molecules) may be pulled off at relatively lower levels on the distillation column.

Some of these blends may be ready to be used at this stage in creating final products, while others of these blends may still need to go through additional processing within an oil refinery or similar facility before they are ready to be used in creating final products. The blends, whether ready immediately post-distillation, or after additional processing, may be considered as being blending components, which are an example of the intermediate components 2004. The blending components may be blended using a variety of different recipes into a number of final products 2008. The final products 2008 may, in the case of an oil refinery, include fuel products such as but not limited to regular gasoline, premium gasoline, aviation fuel, diesel fuel, fuel oil and others.

In some cases, the concepts of intermediate components 2004 being produced in a continuous process such as the continuous process 2006 while final products 2008 are produced in a discontinuous process (e.g. batch process) such as the discontinuous process 2010 may be applicable to a number of other industries. In some cases, intermediate components such as the intermediate components 2004 may be produced during a process that runs over a first time frame. Final products, such as the final products 2008, may be produced during another process that runs over a second time frame that is different from the first time frame. In some cases, the second time frame may at least partially overlap the first time frame, but this is not required. The second time frame may occur immediately after the first time frame, or in some cases the second time frame may occur at some time in the future subsequent to the first time frame.

As an example, the final product may be any of a number of different computer products. One of the intermediate components may be a memory chip. It will be appreciated that the memory chips are produced in a lengthy process that includes semiconductor fabrication. This lengthy process may be considered as a continuous or nearly continuous process. A particular brand and model of memory chip may be used during the assembly of any of a variety of different computer products. It will be appreciated that assembly of a particular computer product occurs over a different time frame than the production of the memory chip that is used in assembling a particular computer representing that particular computer product. If there is a high demand for computer product A, and a lower demand for computer product B, it may be more lucrative to use more of the memory chips in assembly computers of product A, and not to assembly any (or very many) computers of product B.

As a related example, two of the intermediate components may be processor chips. Processor chip A is only used in computer product A, and processor chip B is only used in computer product B. It will be appreciated that the relative demand for computer product A and computer product B as final products may influence the earlier production of the intermediate components. It is helpful to take into account what final product(s) may be produced, or are desired, when determining how to allocate raw ingredients, energy consumption, labor costs and the like when planning production of intermediate components.

These considerations are applicable to a number of other industries beyond computer production. For example, a particular electric motor may be used in several different models of cordless drills. Which model is assembled may be a function of relative demand for each model. Looking at a different level, the winding used in producing that particular electric motor may also be used in producing several other electric motors that may be used in assembly of other tools, such as a circular saw or a reciprocating saw. At another level, copper as a raw ingredient may be used in producing that winding. The copper could also be used in producing wiring. As will be appreciated, optimization of these processes can be a complicated endeavor.

Mass Balance View

Because different production units have different yield profiles, how the feed is distributed to the production units can directly influence the amount of components actually produced. This, in turn, can influence both the amounts of final products produced and what molecules go into each product (in the refinery example). If "u" is assumed to be all of the conjoint variables, such as unit feed rates and yield-altering variables, and "G" is the corresponding model matrix, then G*u represents the models for the component flow rates and their properties, as shown in equation 21:

$$G \cdot u = \begin{bmatrix} G_F \\ G_q \end{bmatrix} \cdot u. \quad (21)$$

It will be appreciated that G is partitioned into $G_F$ and $G_q$. $G_F$*u represents the flow rates of the components produced while $G_q$*u represents their properties such as their qualities. In some cases, the mass or material balance, as represented by the $G_F$ part, functions as a constraint during optimization. Objectives can be set up based on the user's needs. For example, does the user want to maximize yield or to maximize product value. Integrators can be added in $G_F$ to model tank levels for the intermediate components if needed.

FIG. 21 is a schematic illustration of a lifting specification 2100, which includes, for a particular product "i", the necessary daily lower production limit 2102 and the necessary daily upper production limit 2104 for each of a number of days 2106. It will be appreciated that by summing up all of the days 2106, one will reach an aggregate lower limit and an aggregate upper limit for the overall time period. The desired total for a particular product should be between the aggregate lower limit and the upper limit. These production values will be used in optimizing system-wide.

Figure 22:
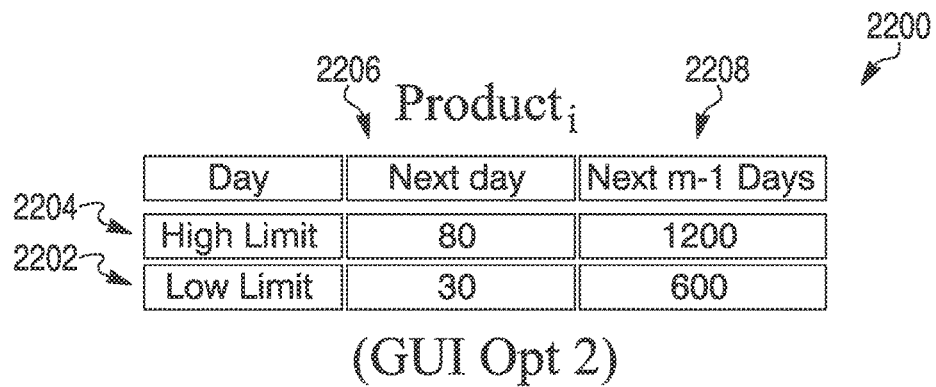
FIG. 22 is a schematic illustration of an illustrative product lifting specification.

FIG. 22 is a schematic illustration of a lifting specification 2200 that includes a low limit 2202 and a high limit 2204. Rather than listing out production for each of a number of individual days, this lifting specification 2200 instead shows lower and upper targets for the next day 2206 and an aggregate lower and upper targets for the next m−1 days 2208. It will be appreciated that regardless of how the lifting specification 2100, 2200 is mapped out on a day to day basis, or a next day and aggregate basis, the lifting specification 2100 and 2200 will, in combination for all of the products, result in an aggregate lifting specification as shown in FIG. 23 for a period of time.

Figure 23:
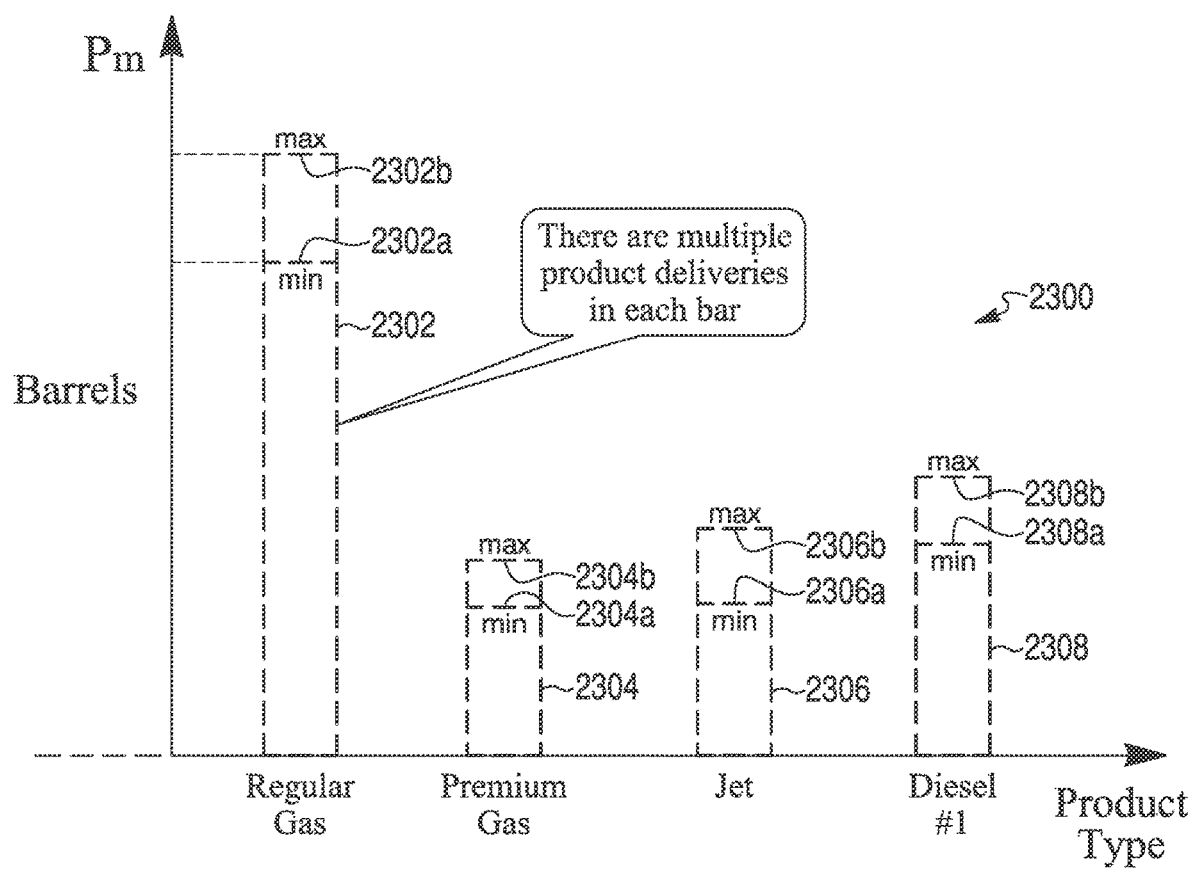
FIG. 23 is a bar graph showing an illustrative product specification of the products to be produced over a predetermined time.

FIG. 23 is a graphical representation of an aggregate lifting specification 2300 that provides a compilation of desired products for a particular time frame. The vertical axis provides an indication of volume, in this case barrels, while the horizontal axis provides an indication of product type. In this particular example, the product type includes regular gas 2302, premium gas 2304, jet fuel 2306 and diesel fuel #1 2308. It will be appreciated that the volumes represented in each product type 2302, 2304, 2306 and 2308 may represent multiple product deliveries. If for example the regular gas 2302 represents a total volume of 10,000 barrels, that may represent a delivery of 5,000 barrels of regular gas to a first customer at a first time during the time frame, a delivery of 3,000 barrels of regular gas to a second customer at a second time during the time frame and 2,000 barrels of regular gas to a third customer at a third time during the time frame. These numbers are merely illustrative.

In the example shown, for each type of product, the lifting specification 2300 includes minimum and maximum limits. For example, the regular gas 2302 includes a minimum limit 2302a and a maximum limit 2302b. The premium gas 2304 includes a minimum limit 2304a and a maximum limit 2304b. The jet fuel 2306 includes a minimum limit 2306a and a maximum limit 2306b. The diesel fuel #1 2308 includes a minimum limit 2308a and a maximum limit 2308b. These limits may be used when optimizing the industrial process.

Figure 24:
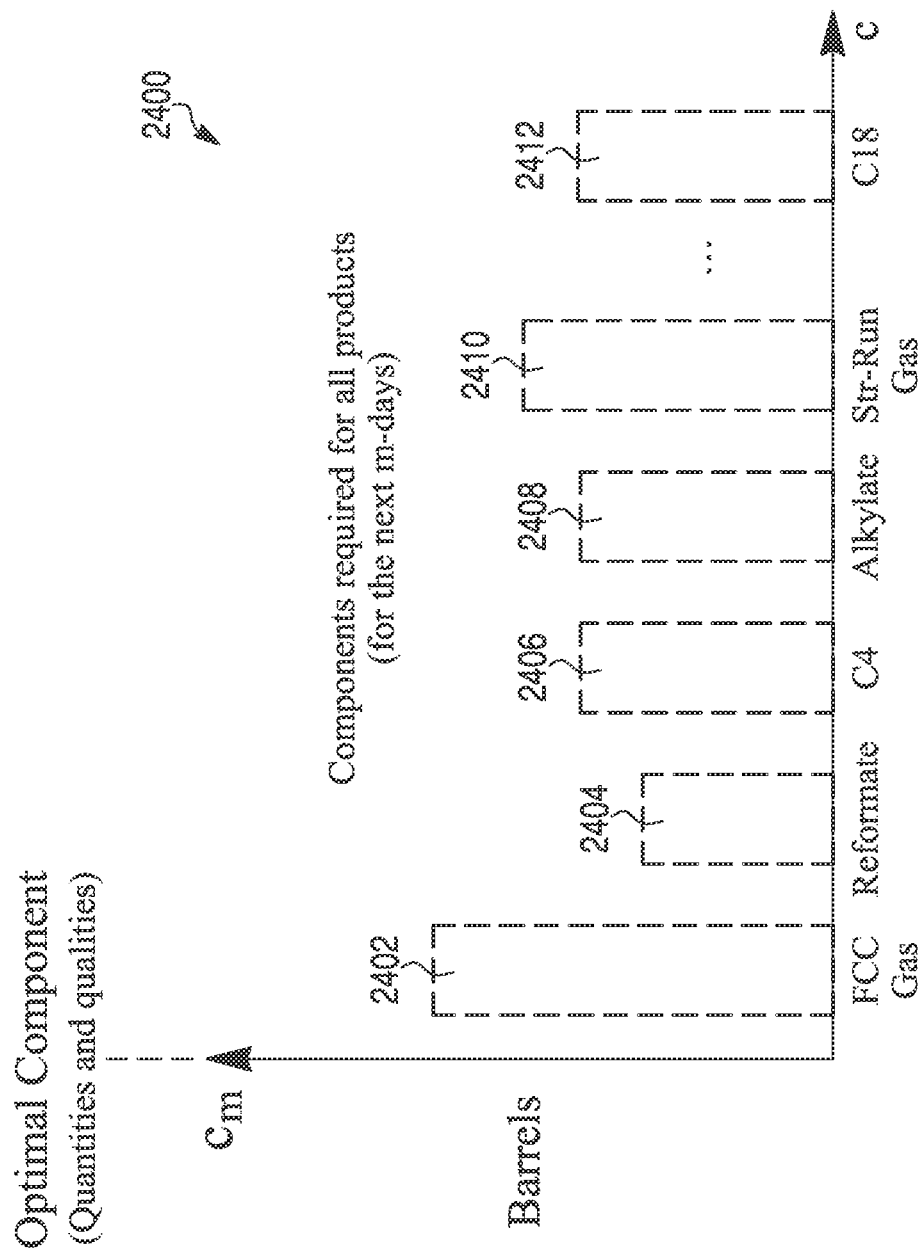
FIG. 24 is a bar graph showing an illustrative component specification for producing the products referenced in FIG. 23.

FIG. 24 is a graphical representation of an aggregate lifting specification 2400 that provides the individual components that will be necessary to produce the desired products shown in the aggregate lifting specification 2300. The vertical axis provides an indication of volume, in this case barrels, while the horizontal axis provides an indication of individual intermediate components. In this particular example, the intermediate components include FCC gas 2402, reformate 2404, C4 2406, alkylate 2408, straight run gas 2410 and C18 2412. It will be appreciated that there may be a number of additional intermediate components that, for simplicity, are not illustrated in the aggregate lifting specification 2400.

In some cases, production of intermediate component $c_m$ may be governed by the following equation:

$$c_m = \int_0^T G_F * u \, dt = R * p_m \quad (22).$$

In this, R represents the recipe and $p_m$ represents a product volume $p_m$. R is a matrix in which the $i^{th}$ column is a fractional recipe for blending the $i^{th}$ product.

$$R = \begin{bmatrix} r_{1,1} & r_{1,2} & \cdots & r_{1,np} \\ r_{2,1} & r_{2,2} & \cdots & r_{2,np} \\ \vdots & & & \vdots \\ r_{nc,1} & r_{nc,2} & \cdots & r_{nc,np} \end{bmatrix} \quad (23)$$

$$\sum_{i=1}^{nc} r_{i,j} \equiv 1.$$

It will be appreciated that in reviewing equation (22) and the above definition of the recipe matrix R, that the recipe matrix R relates the individual intermediate components to the resulting products that can be produced from those individual intermediate components.

In some cases, there may be left over components, known as heels, to be accounted for. A general distribution matrix D can be used to specify these components:

$$D = \begin{bmatrix} d_{1,1} & d_{1,2} & \dots & d_{1,nr} \\ d_{2,1} & d_{2,2} & \dots & d_{2,nr} \\ \vdots & & & \vdots \\ d_{nc,1} & d_{nc,2} & \dots & d_{nc,nr} \end{bmatrix}, \text{ where } \sum_{i=1}^{nc} d_{i,j} \equiv 1. \quad (24)$$

Projected accumulations in the component tank, $C_m$, can be expressed as:

$$C_m = \int_0^T DG_F \cdot u(t)dt + CompHeel_{(t=0)} \quad (25).$$

In the product blending phase, a final product may be blended from multiple fractions of intermediate components, as specified in recipe R. As a result, the projected component consumption may be given by the equation:

$$C_m = R \cdot p_m \quad (26).$$

Figure 25:
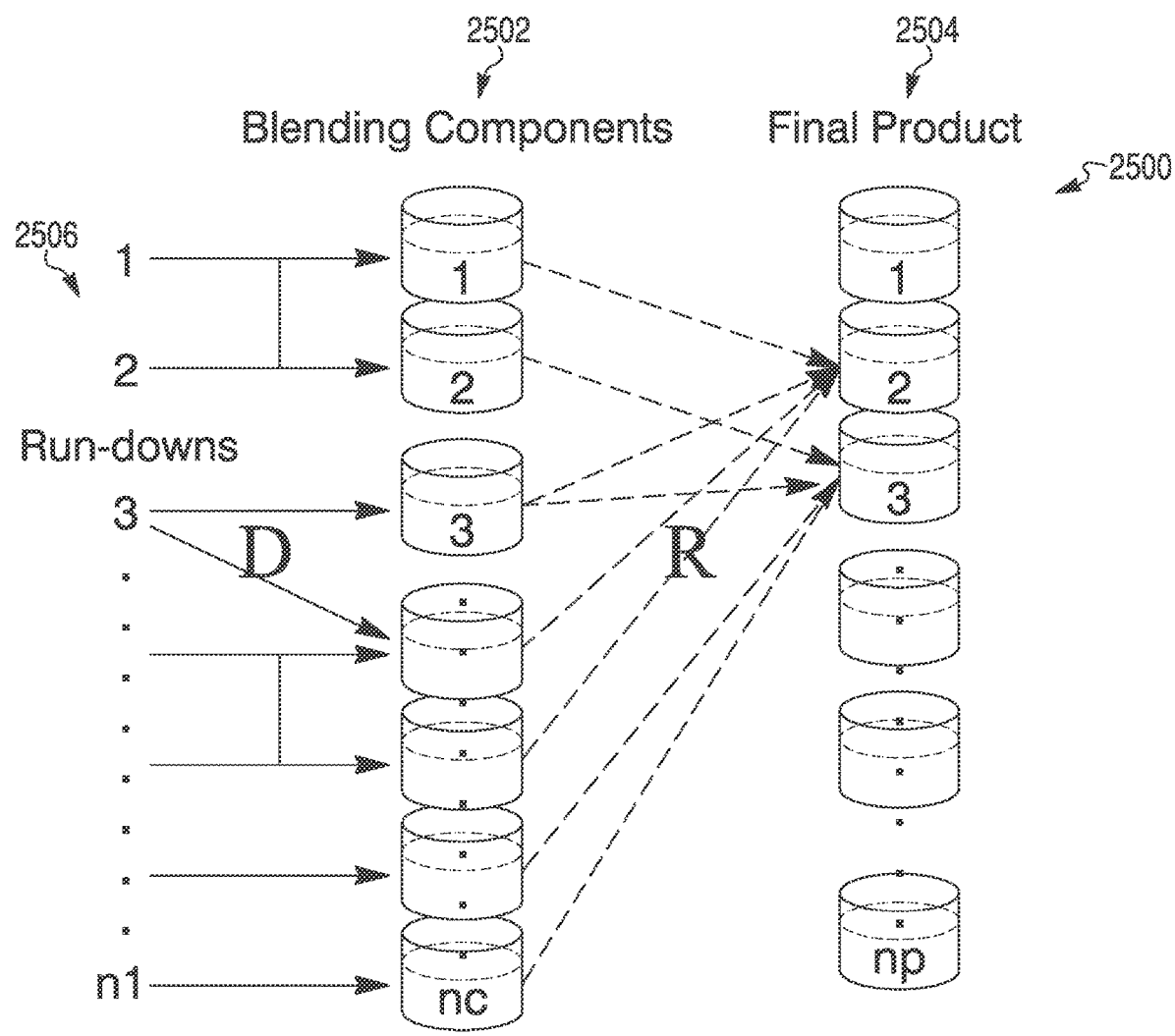
FIG. 25 is a schematic illustration of an example of how particular intermediate components produced by a continuous process are used to produce particular products.

FIG. 25 provides a graphical summary 2500 of how blending components (e.g. intermediate components) 2502 are combined to create final products 2504. In some cases, run-downs or leftovers 2506 may be included as some of the blending components 2502, representing blending components that already exist and thus do not have to be separately distilled or otherwise provided to make the final products 2504. Some of the runs-downs 2506 go only into a specific tank, while others may be split between two or more tanks. For example, the run-downs labeled 1 and 2 flow into both tank 1 and tank 2. This may occur if the run-down labeled 1 and the run-down labeled 2 correspond to the heel, for example.

Quality View

Different units may have different yield-altering variables. Examples of yield-altering variables may include conversion rates, cut points, reaction temperatures and the like, which can be used as conjoint variables. Conjoint variables include Manipulatable Variables (MV) and Dependent Variables (DV). These variables, more often than not, can influence component properties as well. Accordingly, component properties can serve as constraints during optimization. With reference to previously presented equation (21), $G_q$ represents a model for the relationship between component properties and conjoint variable u. Adding a definition for the conjoint variable u provides the equation:

$$G \cdot u = \begin{bmatrix} G_F \\ G_q \end{bmatrix} \cdot u \text{ and } u = \begin{bmatrix} flowrates \\ PropHdls \end{bmatrix} \quad (27)$$

Treatment of Component Tank Heels

The following equations may be useful in treating component tank heels. A general mass balance may be given as:

$$C_m = R \cdot p_m = \int_0^T DG_F \cdot u(t)dt + CompHeel_{(t=0)} \quad (28).$$

When U(t) is a constant within a time horizon T, this simplifies to:

$$C_m = R \cdot p_m = T \cdot DG_F \cdot u + CompHeel_{(t=0)} \quad (29).$$

It will be appreciated that this forms a linear equation in $P_m$ and u:

$$[R \quad -T \cdot DG_F] \cdot \begin{bmatrix} p_m \\ u \end{bmatrix} = CompHeel_{(t=0)}. \quad (30)$$

As a result, different times periods can be constructed when desired:

$$[R \quad -T_1 \cdot DG_{F_1} \quad \dots \quad -T_m \cdot DG_{F_m}] \cdot \begin{bmatrix} p_m \\ u_1 \\ \vdots \\ u_m \end{bmatrix} = CompHeel_{(t=0)}. \quad (31)$$

Formulation for System-Wide Optimization

For example, one may choose to maximize profit, which may be given by the equation:

$$J = \min_{u, R, p_m} \{-Price \cdot p_m + Cost \cdot Feed(u, R, p_m) + \sum_i UnitOpCost_i(u, R, p_m)\}, \quad (32)$$

subject to a number of constraints, some of which may be given by the following equations:

$$R \cdot p_m = \int_0^T DG_F u(t)dt + V_{heel}$$

$$p_{min\ production} \leq p_m \leq p_{max\ production}$$

$$C_{safety\ stock} \leq C_m(T)\{\leq C_{max}\} \text{ or,}$$

$$Cq_{safety} \leq C_m(T) \cdot q_{selected}^{tank}\{\leq Cq_{max}\}$$

$$q_{rd} \leq q^{run-down} = G_q \cdot u \leq \overline{q_{rd}}$$

$$\underline{q_j^{tank}} \leq q_j^{tank}(T) = \frac{\left(q_j^{run-down}\right)^t \cdot \int_0^T DG_F u(t)dt + q_j^{heel} V_{heel}}{\int_0^T DG_F u(t)dt + V_{heel}} \leq \overline{q_j^{tank}},$$

$$\forall j = 1 \dots nq$$

$$\underline{q_j^{product}} \leq R^t \cdot q_j^{tank}(T) \leq \overline{q_j^{product}}, \forall j = 1 \dots nq$$

$$\sum_{i=1}^{nc} r_{i,j} = 1, \forall j, 0 \leq r_{i,j} \leq 1, \forall i, j$$

$$\underline{u} \leq u \leq \overline{u}$$

Figure 26:
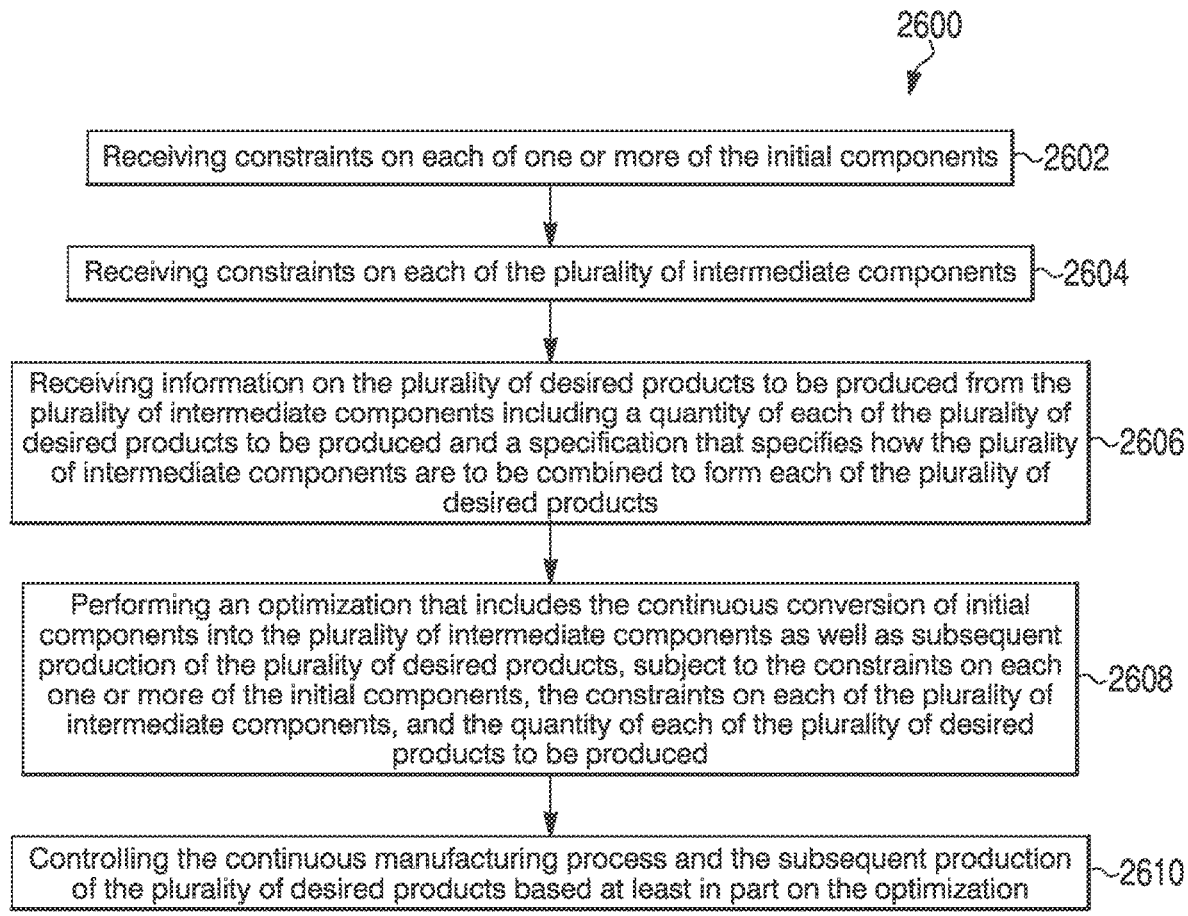
FIG. 26 is a flow diagram showing an illustrative method of optimization.

FIG. 26 is a flow diagram showing an illustrative method 2600 for optimizing continuous conversion of initial components into a plurality of intermediate components that are then used as inputs to make a plurality of desired products. Constraints are received on each of one or more of the initial components as indicated at block 2602. Constraints are received on each of the plurality of intermediate components, as indicated at block 2604. The constraints on each of the plurality of intermediate components may be based at least in part on one or more of the constraints on raw ingredients, inventory storage constraints for the intermediate components, and/or any other suitable constraint. Information is received on the plurality of desired products to be produced from the plurality of intermediate components including a quantity of each of the plurality of desired products to be produced and a specification that specifies how the plurality of intermediate components are to be combined to form each of the plurality of desired products, as indicated at block 2606. An optimization is performed that includes the continuous conversion of initial components into the plurality of intermediate components as well as subsequent production of the plurality of desired products, subject to the constraints on each of one or more of the initial components, the constraints on each of the plurality of intermediate components, and the quantity of each of the plurality of desired products to be produced, as indicated at block 2608. In some cases, the optimization may be performed using equation (32) or the like. As indicated at block 2610, the continuous manufacturing process and the subsequent production of the plurality of desired products may be controlled based at least in part upon the optimization.

In some cases, the received information may define one or more properties of each of the plurality of desired products, and wherein the optimization may be performed subject to the one or more properties of each of the plurality of desired products to be produced. The optimization may include optimizing one or more of an output quantity of one or more of the plurality of desired products, an output yield of one or more of the plurality of desired products, one or more properties of one or more of the plurality of desired products and/or a profit. In some cases, each of the intermediate components may be stored in a corresponding container before being fed as an input to make the plurality of desired products, but this is not required.

Figure 27:
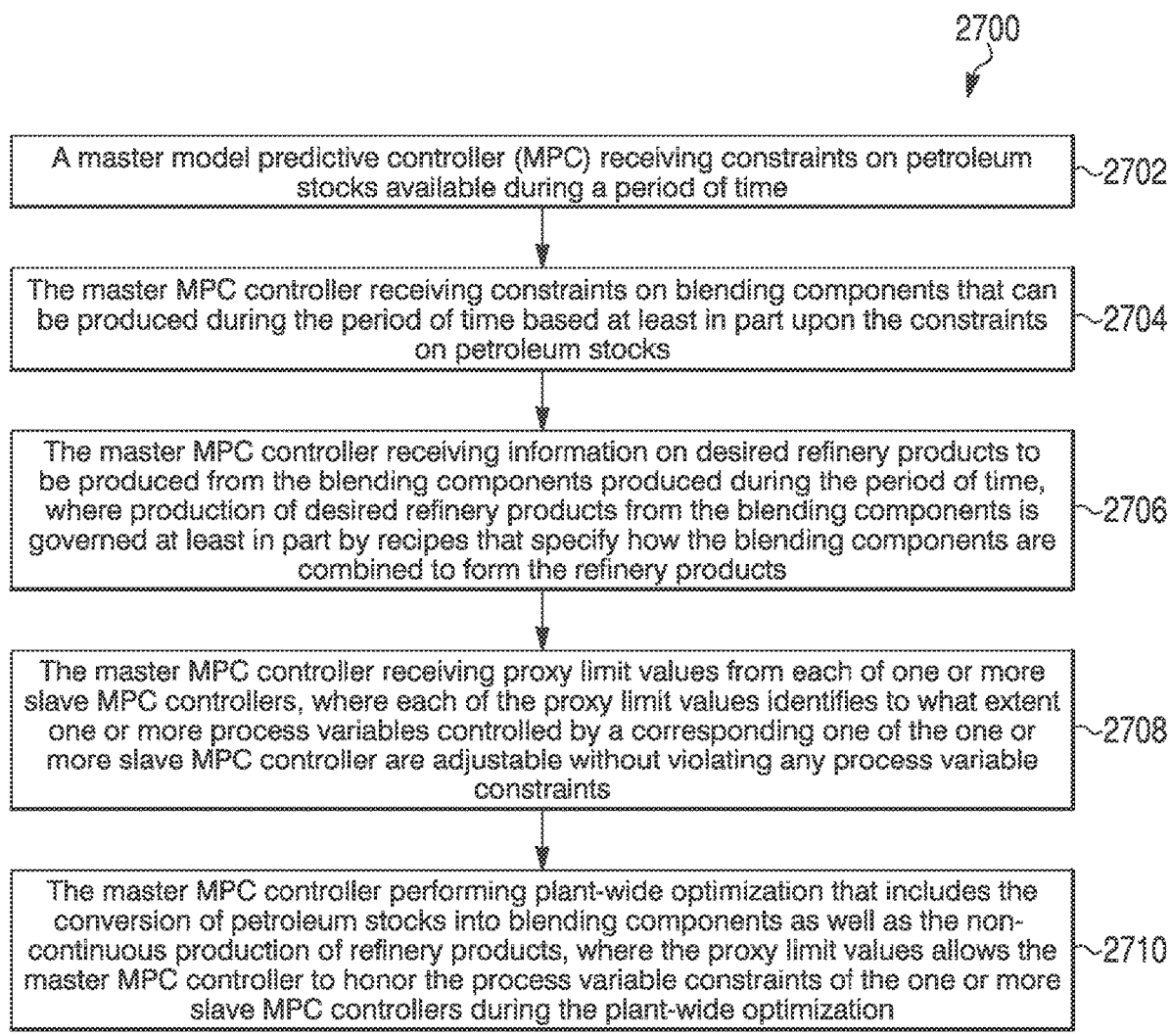
FIG. 27 is a flow diagram showing an illustrative method of optimization.

FIG. 27 is a flow diagram showing an illustrative method 2700 for optimizing continuous conversion of raw ingredients into intermediate components and non-continuous conversion of the intermediate components into products. A master model predictive controller (MPC) receives constraints on raw ingredients available for use during a period of time, as indicated at block 2702. The master MPC controller receives constraints on intermediate components that can be produced during the period of time based at least in part on one or more of the constraints on raw ingredients and inventory storage constraints for the intermediate components and/or products, as indicated at block 2704. The master MPC controller receives information on desired products to be produced during the period of time, where production of desired products from the intermediate components is governed at least in part by recipes that specify how the intermediate components are to be combined to form the products, as indicated at block 2706. In some instances, the master MPC controller receives proxy limit values from each of one or more slave MPC controllers, where each of the proxy limit values identifies to what extent one or more process variables controlled by the corresponding slave MPC controller are adjustable without violating any process variable constraints, as indicated at block 2708. The master MPC controller performs plant-wide optimization that includes the continuous conversion of raw ingredients into intermediate components as well as the non-continuous production of products from the intermediate components, where the proxy limit value allows the master MPC controller to honor the process variable constraints of the one or more slave MPC controllers during the plant-wide optimization, as indicated at block 2710.

In some instances, the constraints on raw ingredients may include quantity availability of one or more of the raw ingredients, timing of when one or more raw ingredients are available, and quality of one or more of the raw ingredients. In another example, the constraints on raw ingredients may include the cost of one or more of the raw ingredients. There may be a number of constraints on the intermediate components as well. For example, constraints on intermediate components may include whether there is available storage space for one or more of the intermediate components. For a particular intermediate component, there may be a lower production limit and/or an upper production limit. There may be limitations on equipment that is used to produce at least some of the intermediate components. The availability and/or cost of purchasing one or more of the intermediate components already formed may also be a constraint.

It will be appreciated that a particular product may have a first recipe by which the particular product may be formed from a first combination of intermediate components and a second recipe, different from the first recipe, by which the particular product may be formed from a second, different, combination of intermediate components. In some cases, this can be taken into account during the optimization. In some cases, the intermediate components can be combined into any of a variety of different products, depending on relative demand for each of the variety of different products. In some cases, the intermediate components may be produced over a first time frame and the products may be produced from the intermediate components over a second time frame. In some cases, the first time frame at the second time frame are different but overlap. In some cases, the first time frame and the second time frame do not overlap.

At least some of the proxy limit values received from one or more of the slave MPC controllers may be based on one or more MPC models used by the one or more of the slave MPC controllers. As an example, each proxy limit value may identify a minimum value or a maximum value obtainable for one process variable without violating and process variable constraints.

In some cases, the intermediate components may include electronic components, and the products may include one of a variety of different electronics that can be assembled using the intermediate components. In some cases, the raw ingredients include petroleum stocks and the intermediate components may include hydrocarbons of varying chain length. The products may, for example include fuels that are produced by combining the intermediate components. These are just examples.

Figure 28:
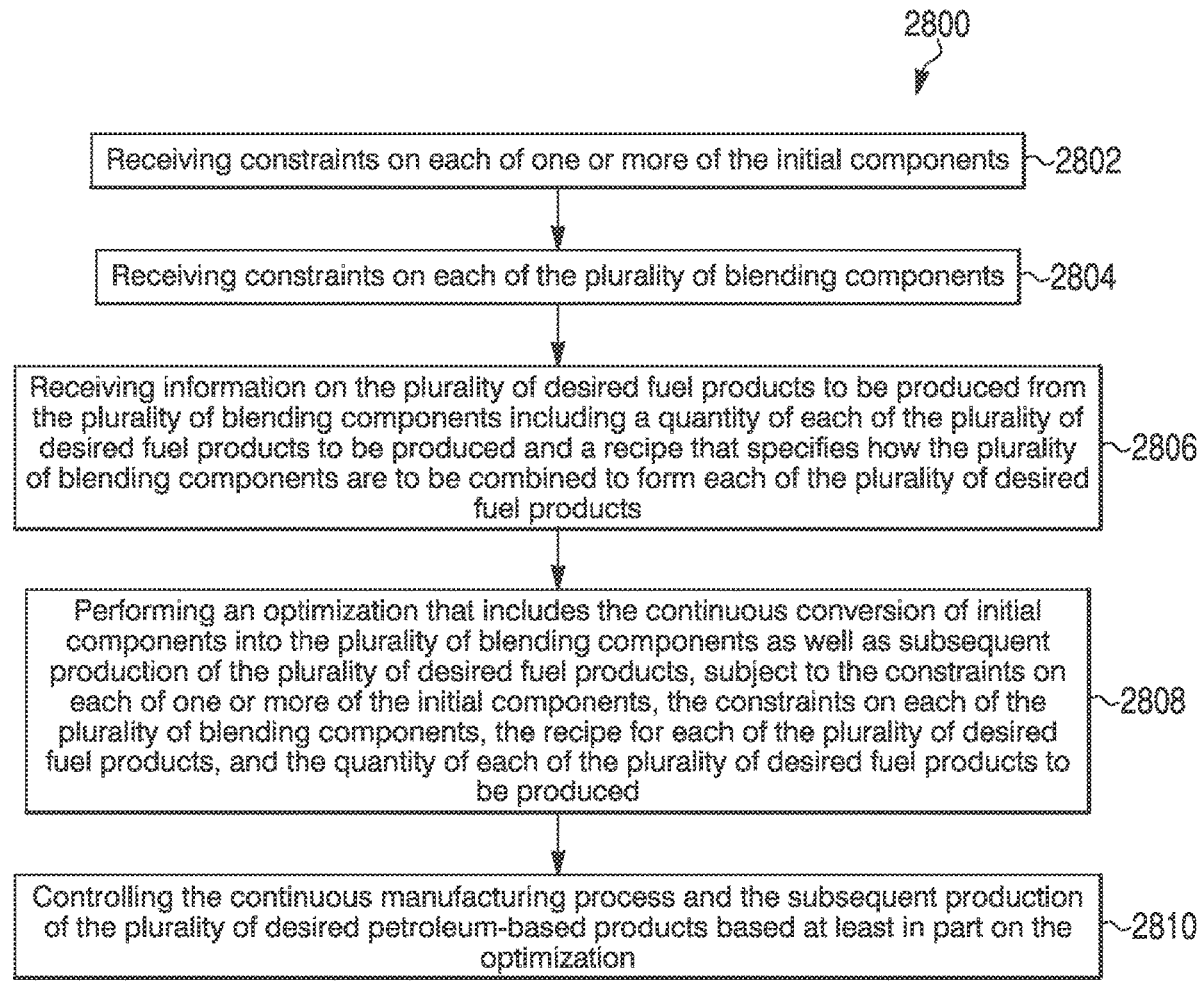
FIG. 28 is a flow diagram showing an illustrative method of optimization.

FIG. 28 is a flow diagram showing an illustrative method 2800 for optimizing continuous conversion of initial components into a plurality of blending components that are then used as inputs to make a plurality of desired fuel products. Constrains are received on each of one or more of the initial components, as indicated at block 2802. Constraints are received on each of the plurality of blending components (e.g. intermediate components), as indicated at block 2804. Information is received on the plurality of desired fuel products to be produced from the plurality of blending components including a quantity of each of the plurality of desired fuel products to be produced and one or more recipes that specifies how the plurality of blending components are to be combined to form each of the plurality of desired fuel products, as indicated at block 2806. An optimization is performed that includes the continuous conversion of initial components into the plurality of blending components as well as subsequent production of the plurality of desired fuel products, subject to the constraints on each of one or more of the initial components, the constraints on each of the plurality of blending components, the recipe for each of the plurality of desired fuel products, and the quantity of each of the plurality of desired fuel products to be produced, as indicated at block 2808. In some cases, the optimization may be performed using equation (32) or the like. The continuous manufacturing process and the subsequent production of the plurality of desired fuel petroleum-based products may be controlled based at least in part upon the optimization, as indicated at block 2810.

The received information on the plurality of desired fuel products to be produced may define one or more properties of each of the plurality of desired fuel products, and wherein the optimization may be performed subject to meeting the one or more properties of each of the plurality of desired fuel products to be produced. The optimization may optimize one or more of an output quantity of one or more of the plurality of desired fuel products, an output yield of one or more of the plurality of desired fuel products, one or more properties of one or more of the plurality of desired fuel products, and/or profit. In some cases, each of the plurality of blending components are stored in a corresponding container before being fed as an input to make the plurality of desired fuel products, but this is not required.

Figure 29:
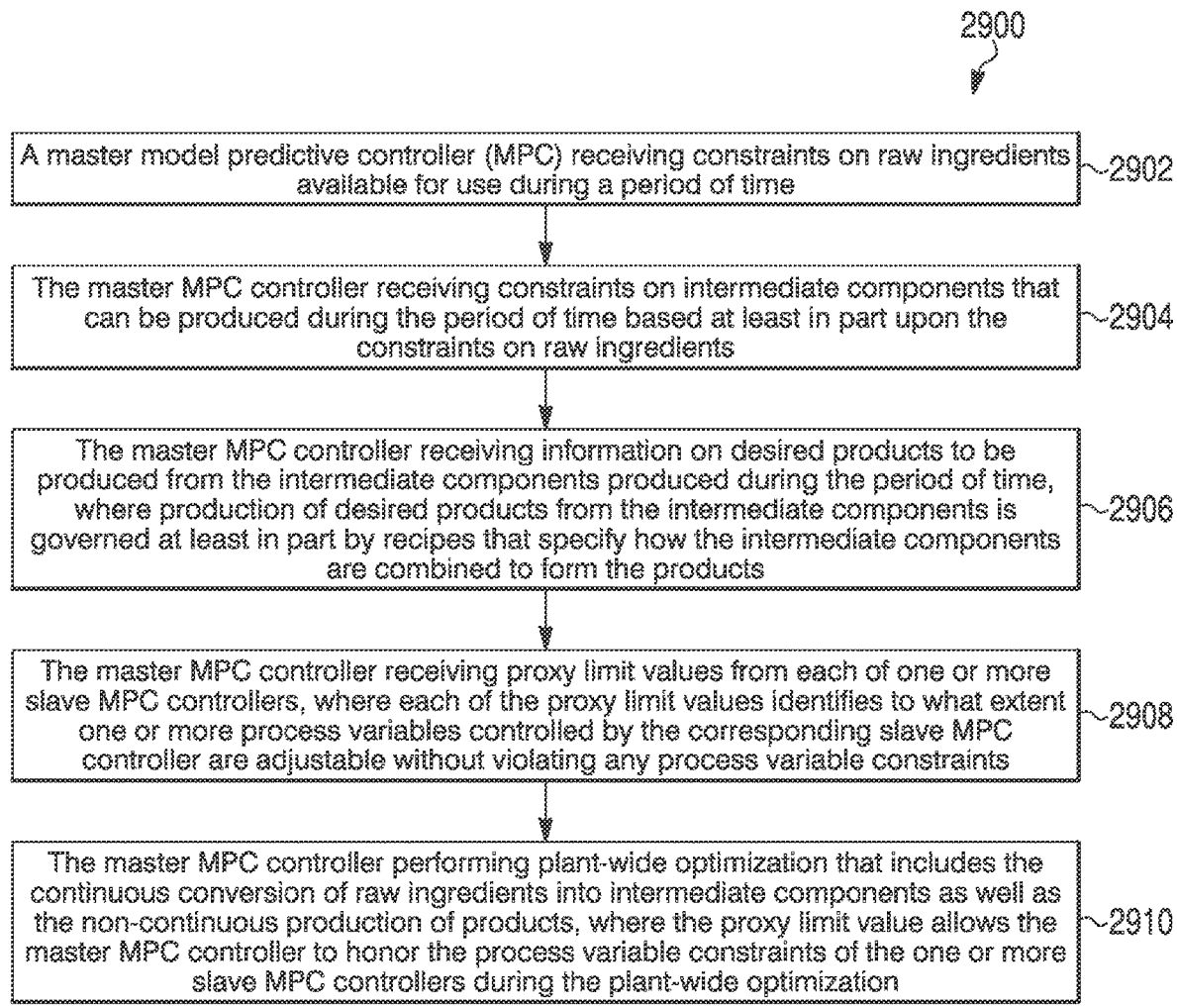
FIG. 29 is a flow diagram showing an illustrative method of optimization.

FIG. 29 is a flow diagram showing an illustrative method 2900 for optimizing continuous conversion of petroleum stocks into blending components and non-continuous conversion of the blending components into refinery product. A master model predictive controller (MPC) receives constraints on petroleum stocks available during a period of time, as indicated at block 2902. The master MPC controller receives constraints on blending components (e.g. intermediate components) that can be produced during the period of time, sometimes based at least in part on one or more of the constraints on petroleum stocks and inventory storage constraints for the blending components and/or refinery products, as indicated at block 2904. The master MPC controller receives information on desired refinery products to be produced from the blending components produced during the period of time, where production of desired refinery products from the blending components is governed at least in part by recipes that specify how the blending components are to be combined to form the refinery products, as indicated at block 2906. In some cases, the master MPC controller receives proxy limit values from each of one or more slave MPC controllers, where each of the proxy limit values identifies to what extent one or more process variables controlled by a corresponding one of the one or more slave MPC controller are adjustable without violating any process variable constraints, as indicated at block 2908. The master MPC controller performs plant-wide optimization that includes the continuous conversion of petroleum stocks into blending components as well as the non-continuous production of refinery products, where the proxy limit values allows the master MPC controller to honor the process variable constraints of the one or more slave MPC controllers during the plant-wide optimization, as indicated at block 2910.

At least some of the petroleum stocks may include distillation column products. Constraints on petroleum stocks may, for example, include the timing of when one or more of the petroleum stocks may be available, or the cost of one or more of the petroleum stocks. The blending components may include hydrocarbons of varying chain length. The refinery products may include fuels that are produced by combining the blending components.

As noted above, constraints on blending components may include the availability of storage space for one or more of the blending components. Additional constraints on blending components may include a lower production limit for a particular blending component as well as an upper production limit for that particular blending component. Constraints on blending components may include limitations on equipment used to produce the blending components. The availability and/or cost of purchasing one or more of the blending components already formed may also be a constraint on blending components.

In some cases, a particular refinery product may have a first recipe by which the particular refinery product may be formed from a first combination of blending components and a second recipe, different from the first, by which the particular refinery product may be formed from a second, different, combination of blending components. In some cases, this can be taken into account during the optimization. The blending components can be combined into any of a variety of different refinery products, depending on relative demand for each of the variety of different refinery products.

At least some of the proxy limit values received from one or more of the slave MPC controllers may be based on one or more MPC models used by the one or more of the slave MPC controllers. Each proxy limit value may identify a minimum value or a maximum value obtainable for one process variable without violating and process variable constraints. The blending components may be produced over a first time frame and the refinery products may be produced from the blending components over a second time frame different from the first time frame. In some cases, the first time frame at the second time frame partially overlap. In some cases, the first time frame and the second time frame do not overlap.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The disclosure's scope is, of course, defined in the language in which the appended claims are expressed

What is claimed is:

1. A method for optimizing a process across both a continuous conversion of raw ingredients into intermediate components and a non-continuous conversion of the intermediate components into a plurality of desired products, the method comprising:

a master model predictive controller (MPC) receiving first constraints on the raw ingredients available for use during a predetermined future time period;

the master MPC controller receiving second constraints on the intermediate components that can be produced during the predetermined future time period based at least in part on one or more of the first constraints on the raw ingredients and inventory storage constraints for the intermediate components;

the master MPC controller receiving information on a desired quantity and desired product type of each of the plurality of desired products to be produced from the intermediate components during the predetermined future time period, where production of the plurality of desired products from the intermediate components is governed at least in part by recipes that specify how the intermediate components are combined to form the plurality of desired products;

the master MPC controller receiving proxy limit values from each of one or more slave MPC controllers, where each of the proxy limit values identifies to what extent one or more process variables controlled by a corresponding slave MPC controller of the one or more slave MPC controllers are adjustable without violating any constraints of the one or more process variables that are controlled by the corresponding slave MPC controller; and the master MPC controller performing plant-wide optimization collectively optimizing the continuous conversion of the raw ingredients into the intermediate components and the non-continuous conversion of the intermediate components into the desired quantity and desired product type of the plurality of desired products such that an optimized quantity of each of the intermediate components is produced to support the non-continuous conversion of the optimized quantity of the intermediate components into the desired quantity and the desired product type of each of the plurality of desired products during the predetermined future time period, and where the proxy limit values allow the master MPC controller to honor the constraints of the one or more process variables of the one or more slave MPC controllers during the plant-wide optimization.

2. The method of claim 1, wherein the first constraints on the raw ingredients include quantity availability of one or more of the raw ingredients, timing of when one or more of the raw ingredients are available, and quality of one or more of the raw ingredients.

3. The method of claim 1, wherein the first constraints on the raw ingredients include cost of one or more of the raw ingredients.

4. The method of claim 1, wherein the second constraints on the intermediate components include available storage space for one or more of the intermediate components.

5. The method of claim 1, wherein the second constraints on the intermediate components include a lower production limit for a particular intermediate component of the intermediate components as well as an upper production limit for the particular intermediate component.

6. The method of claim 1, wherein the second constraints on the intermediate components include limitations of equipment used to produce the intermediate components.

7. The method of claim 1, wherein the second constraints on the intermediate components include availability and/or cost of purchasing one or more of the intermediate components already formed.

8. The method of claim 1, wherein a particular product may have a first recipe of the recipes by which the particular product may be formed from a first combination of the intermediate components and a second recipe of the recipes, different from the first recipe, by which the particular product may be formed from a second combination of the intermediate components different from the first combination.

9. The method of claim 1, wherein the intermediate components can be combined into any of a variety of different products of the plurality of desired products, depending on relative demand for each of the variety of different products.

10. The method of claim 1, wherein at least some of the proxy limit values received from the one or more slave MPC controllers are based on one or more MPC models used by the one or more slave MPC controllers.

11. The method of claim 1, wherein each proxy limit value of the proxy limit values identifies a minimum value or a maximum value obtainable for one process variable of the process variables without violating any constraints of the one process variable.

12. The method of claim 1, wherein the intermediate components are produced via the continuous conversion of the raw ingredients over a first time frame and the plurality of desired products are produced via the non-continuous conversion of the intermediate components over a second time frame different from the first time frame.

13. The method of claim 12, wherein the intermediate components comprise electronic components, and a product of the plurality of desired products comprises one of a variety of different electronics that can be assembled using the intermediate components.

14. The method of claim 1, wherein the raw ingredients comprise petroleum stocks and the intermediate components comprise hydrocarbons of varying chain length.

15. The method of claim 14, wherein the plurality of desired products comprise fuels produced by combining the intermediate components.

16. A method for optimizing a process across both a continuous conversion of initial components into a plurality of intermediate components that are then used as inputs in a non-continuous conversion of the plurality of intermediate components into a plurality of desired products, the method comprising:

receiving first constraints on each of one or more of the initial components;

receiving second constraints on each of the plurality of intermediate components;

receiving information on a quantity and type of the plurality of desired products to be produced from the plurality of intermediate components during a predetermined future period of time, and a plurality of recipes that specifies how the plurality of intermediate components are to be combined to form the plurality of desired products, wherein a particular product of the plurality of desired products includes a first recipe of the plurality of recipes by which the particular product maybe formed from a first combination of the plurality of intermediate components, and a second recipe of the plurality of recipes different from the first recipe by which the particular product maybe formed from a second combination of the plurality of intermediate components different from the first combination;

performing an optimization across both the continuous conversion of the initial components into the plurality of intermediate components as well as the non-continuous production of the plurality of desired products to produce a first optimized quantity of each of the plurality of intermediate components to feed production of a second optimized quantity of each of the plurality of desired products during the future period of time, including selecting either the first recipe or the second recipe to form the particular product of the plurality of desired products, the optimization is performed subject to the first constraints on each of one or more of the initial components, the second constraints on each of the plurality of intermediate components, and the quantity and type of each of the plurality of desired products to be produced.

17. The method of claim 16, further comprising receiving one or more properties of each of the plurality of desired products, and wherein the optimization is performed subject to the one or more properties of each of the plurality of desired products to be produced.

18. The method of claim 16, wherein the optimization optimizes:

an output quantity of one or more of the plurality of desired products;

an output yield of one or more of the plurality of desired products;

one or more properties of one or more of the plurality of desired products; and/or a profit.

19. The method of claim 16, wherein each of the plurality of intermediate components are stored in a corresponding container before being fed as an input of the inputs to the non-continuous production of the plurality of desired products.

20. A non-transitory computer readable medium with instructions stored thereon that when executed by one or more processors causes the one or more processors to:
   receive first constraints on initial components of a continuous manufacturing process that produces a plurality of intermediate components;
   receive second constraints on the plurality of intermediate components produced by the continuous manufacturing process;
   receive information on a product type, an aggregate lower limit and an aggregate upper limit for each of a plurality of desired products to be produced from the plurality of intermediate components during a predetermined future time period, and a specification that specifies how the plurality of intermediate components are to be combined to form each of the plurality of desired products; and
   perform an optimization that collectively optimizes the continuous manufacturing process that produces the plurality of intermediate components as well as a non-continuous production of the plurality of desired products from the plurality of intermediate components resulting in a production of a first optimized quantity of each of the plurality of intermediate components to feed production of a second optimized quantity of each of the plurality of desired products, wherein the second optimized quantity of each of the plurality of desired products falls between the aggregate lower limit and the aggregate upper limit associated with the corresponding desired product, wherein the optimization is subject to the first constraints on the initial components of the continuous manufacturing process, the second constraints on the plurality of intermediate components, and a quantity and type of each of the plurality of desired products to be produced; and
   control the continuous manufacturing process and the non-continuous production of the plurality of desired products based at least in part on the optimization.

* * * * *